(12) United States Patent
Willshire et al.

(10) Patent No.: US 11,711,467 B2
(45) Date of Patent: Jul. 25, 2023

(54) SYSTEM AND METHODS FOR CHATBOT AND SEARCH ENGINE INTEGRATION

(71) Applicant: Cyara Solutions Pty Ltd, Hawthorn (AU)

(72) Inventors: Geoff Willshire, Greenslopes (AU); Florian Treml, Klausenleopoldsdorf (AT); Christoph Börner, Vienna (AT)

(73) Assignee: CYARA SOLUTIONS PTY LTD, Hawthorn Vic (AU)

( * ) Notice: Subject to any disclaimer, the term of this patent is extended or adjusted under 35 U.S.C. 154(b) by 0 days.

(21) Appl. No.: 17/943,095

(22) Filed: Sep. 12, 2022

(65) Prior Publication Data

US 2022/0407961 A1 Dec. 22, 2022

Related U.S. Application Data

(63) Continuation-in-part of application No. 17/896,024, filed on Aug. 25, 2022, which is a
(Continued)

(51) Int. Cl.
*H04M 3/493* (2006.01)
*H04M 7/12* (2006.01)
(Continued)

(52) U.S. Cl.
CPC ............ *H04M 3/493* (2013.01); *G06F 16/22* (2019.01); *G10L 15/22* (2013.01); *H04M 3/24* (2013.01);
(Continued)

(58) Field of Classification Search
CPC .... G06F 3/0631; G06F 16/22; G06F 16/2228; G06F 16/24; G06F 16/319; G06F 16/9024; G06F 16/90332; G06F 16/9038; G06F 16/951; G06F 16/953; G06F 16/9535; G06F 40/237; G06N 3/004; G06N 20/00; G06Q 30/02; G06Q 30/0282; G06Q 30/0217; G10L 15/22; G10L 15/26; H04L 51/02;
(Continued)

(56) References Cited

U.S. PATENT DOCUMENTS 7,797,635 B1 * 9/2010 Denise ................. G06F 16/9038
707/711
9,883,026 B2 1/2018 Aldecoa et al.
(Continued)

*Primary Examiner* — Gerald Gauthier
(74) *Attorney, Agent, or Firm* — Galvin Patent Law LLC; Brian R. Galvin

(57) ABSTRACT

A system and method for chatbot and search engine integration comprising chatbot crawler engine configured to detect all possible paths through a conversational flow between a chatbot and a user, and also comprising a chatbot search integration manager configured to receive a processed conversation flow from the chatbot crawler engine, parse the conversation flow to identify keywords and features, and build an indexable data structure which can be integrated into search engines in order to expose the information and data contained within the chatbot's knowledge base. This integration may allow search engine users to be redirected to a website hosting the chatbot when an indexed data structure comprises information relevant to a search engine query.

20 Claims, 17 Drawing Sheets

Related U.S. Application Data continuation-in-part of application No. 16/985,652, filed on Aug. 5, 2020, now Pat. No. 11,489,962, which is a continuation-in-part of application No. 16/379,084, filed on Apr. 9, 2019, now abandoned, which is a continuation of application No. 15/091,556, filed on Apr. 5, 2016, now Pat. No. 10,291,776, which is a continuation-in-part of application No. 14/590,972, filed on Jan. 6, 2015, now Pat. No. 10,091,356.

(60) Provisional application No. 63/354,618, filed on Jun. 22, 2022, provisional application No. 63/354,616, filed on Jun. 22, 2022.

(51) Int. Cl.
  *H04M 3/24*   (2006.01)
  *G10L 15/22*  (2006.01)
  *G06F 16/22*  (2019.01)
  *G06F 16/24*  (2019.01)

(52) U.S. Cl.
  CPC ....... *H04M 3/4938* (2013.01); *H04M 7/1295* (2013.01); *G06F 16/24* (2019.01)

(58) Field of Classification Search
  CPC ........ H04M 3/24; H04M 3/323; H04M 3/493; H04M 3/4936; H04M 3/4938; H04M 7/1295
  See application file for complete search history.

(56) References Cited

U.S. PATENT DOCUMENTS

| | | | |
|---|---|---|---|
| 10,896,163 B1* | 1/2021 | Bowles | G06F 16/319 |
| 11,276,393 B2 | 3/2022 | Lu et al. | |
| 2002/0169611 A1* | 11/2002 | Guerra | G10L 15/26 |
| | | | 704/E15.045 |
| 2003/0023440 A1* | 1/2003 | Chu | H04M 3/4938 |
| | | | 704/E15.021 |
| 2009/0281966 A1* | 11/2009 | Biggs | H04L 51/02 |
| | | | 706/11 |
| 2010/0268700 A1* | 10/2010 | Wissner | G06F 16/951 |
| | | | 707/706 |
| 2012/0041903 A1* | 2/2012 | Beilby | G06N 20/00 |
| | | | 706/11 |
| 2012/0095977 A1* | 4/2012 | Levin | G06Q 30/02 |
| | | | 707/706 |
| 2012/0095978 A1* | 4/2012 | Levin | G06F 16/9535 |
| | | | 707/706 |
| 2012/0166180 A1* | 6/2012 | Au | G06F 40/237 |
| | | | 704/9 |
| 2012/0290553 A1* | 11/2012 | England | G06Q 30/0282 |
| | | | 707/706 |
| 2013/0185182 A1* | 7/2013 | Au | G06Q 30/0217 |
| | | | 705/35 |
| 2014/0222826 A1* | 8/2014 | DaCosta | G06F 16/2228 |
| | | | 707/741 |
| 2016/0085824 A1* | 3/2016 | Chadha | G06F 16/951 |
| | | | 707/706 |
| 2017/0168751 A1* | 6/2017 | Stevens | G06F 3/0631 |
| 2022/0407960 A1* | 12/2022 | Willshire | H04M 3/493 |
| 2022/0407961 A1* | 12/2022 | Willshire | H04M 3/24 |

\* cited by examiner

SYSTEM AND METHODS FOR CHATBOT AND SEARCH ENGINE INTEGRATION

CROSS-REFERENCE TO RELATED APPLICATIONS

Priority is claimed in the application data sheet to the following patents or patent applications, the entire written description of each of which is expressly incorporated herein by reference in its entirety:
63/354,618
Ser. No. 17/896,024
63/354,616
Ser. No. 16/985,652
Ser. No. 16/379,084
Ser. No. 15/091,556
Ser. No. 14/590,972

BACKGROUND OF THE INVENTION

Field of the Art

The disclosure relates to the field of automated testing systems, more specifically to the field of automated chatbot testing.

Discussion of the State of the Art

Chatbots and conversational artificial intelligence (AI) systems have become more a prominent feature of many enterprises across a plurality of domains and industries. Generally, chatbots contain expansive knowledge bases relevant to a given domain in order to facilitate chatbot-customer interactions, but oftentimes the information and data contained in a chatbot knowledge bases is kept hidden within the chatbot engine. This information and data may be useful and relevant to individuals and entities that do not necessarily interact with a chatbot. If this information could be exposed such that chatbot knowledge could become indexable for search engine purposes, it would improve a given chatbots marketing and reach to new customers.

What is needed is a system and method for integrating chatbot knowledge with search engines.

SUMMARY OF THE INVENTION

Accordingly, the inventor has conceived and reduced to practice, a system and method for chatbot and search engine integration comprising chatbot crawler engine configured to detect all possible paths through a conversational flow between a chatbot and a user, and also comprising a chatbot search integration manager configured to receive a processed conversation flow from the chatbot crawler engine, parse the conversation flow to identify keywords and features, and build an indexable data structure which can be integrated into search engines in order to expose the information and data contained within the chatbot's knowledge base. This integration may allow search engine users to be redirected to a website hosting the chatbot when an indexed data structure comprises information relevant to a search engine query.

The following non-limiting summary of the invention is provided for clarity, and should be construed consistently with embodiments described in the detailed description below.

According to a preferred embodiment, a system for integrating a chatbot with a search engine is disclosed, comprising: a chatbot crawler comprising a first plurality of programming instructions stored in a memory of, and operating on a processor of, a computing device, wherein the first plurality of programming instructions, when operating on the processor, cause the computing device to: connect to an enterprise chatbot and traverse a conversation flow detecting one or more conversation paths; for each detected conversation path generate a flow chart and a conversation; and send the flow chart to a chatbot search integration manager; and the chatbot search integration manager comprising a second plurality of programming instructions stored in the memory of, and operating on the processor of, the computing device, wherein the second plurality of programming instructions, when operating on the processor, cause the computing device to: receive the flow chart from the chatbot crawler engine; parse the flow chart to extract text data; transform the extracted text data into one or more index keywords; create a data structure comprising the index keywords; store the data structure in a database; and connect to a search engine, wherein the search engine's built in crawler crawls the data structure and assigns a page rank to the data structure.

According to another preferred embodiment, a method for integrating a chatbot with a search engine is disclosed, comprising the steps of: connecting to an enterprise chatbot and traverse a conversation flow detecting one or more conversation paths; for each detected conversation path generating a flow chart and a conversation; sending the flow chart to a chatbot search integration manager, receiving the flow chart from the chatbot crawler engine; parsing the flow chart to extract text data; transforming the extracted text data into one or more index keywords; creating a data structure comprising the index keywords; storing the data structure in a database; and connecting to a search engine, wherein the search engine's built in crawler crawls the data structure and assigns a page rank to the data structure.

According to an aspect of an embodiment, the user interface is an administrator interface comprising a second plurality of programming instructions stored in the memory of, and operating on the processor of, the computing device, wherein the second plurality of programming instructions, when operating on the processor, cause the computing device to: allow a user to create a chatbot test script; store the created chatbot test script in a database; receive the results of the conversational flow from the chatbot testing server, and display the results of the conversational flow.

According to an aspect of an embodiment, the chatbot integration manager parses the flow chart according to a graph traversal algorithm.

According to an aspect of an embodiment, the data structure is a static HyperText Markup Language webpage.

According to an aspect of an embodiment, the assigned page rank is associated with the data structure and stored in the database.

According to an aspect of an embodiment, a machine learning algorithm configured to determine an optimal format for the data structure.

According to an aspect of an embodiment, a page optimization engine comprising a third plurality of programming instructions stored in the memory of, and operating on the processor of, the computing device, wherein the third plurality of programming instructions, when operating on the processor, cause the computing device to: receive the data structure; use the data structure as an input into the machine learning algorithm, wherein the machine learning algorithm outputs an optimized data structure format; and send the machine learning output to the chatbot search integration manager.

According to an aspect of an embodiment, the chatbot search integration manager creates a data structure using the received machine learning output as the format for the data structure.

According to an aspect of an embodiment, the machine learning algorithm is a neural network.

According to an aspect of an embodiment, the machine learning algorithm is configured by training the algorithm on training data comprising at least static webpages and for each static webpage an associated with page rank.

According to an aspect of an embodiment, the page optimization engine retrieves the assigned page rank of the data structure and determines if the format is optimal by comparing the page rank to a predetermined threshold value.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
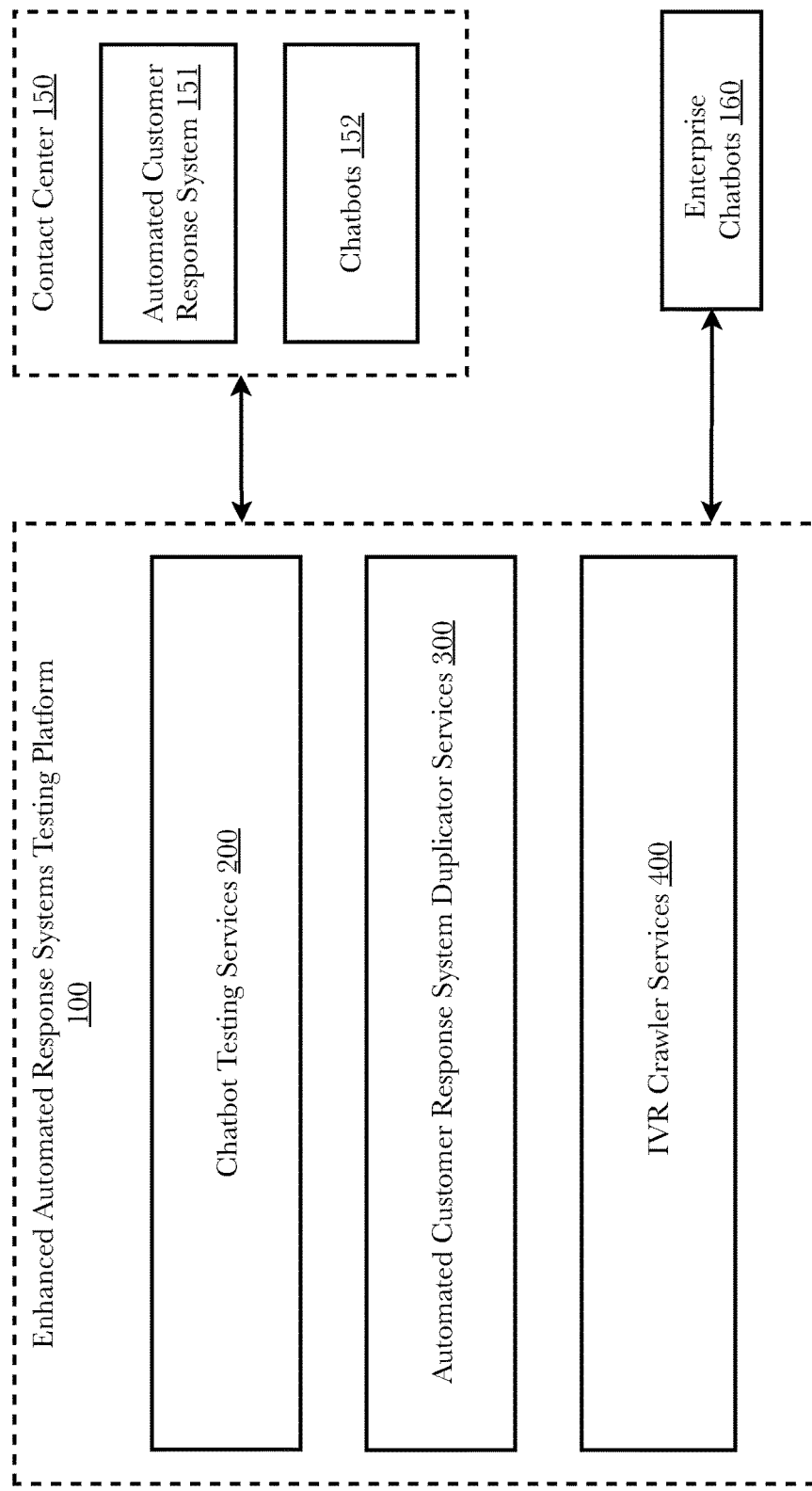
FIG. 1 is a block diagram illustrating an exemplary system architecture for an enhanced testing and duplication of automated response systems platform.

The inventor has conceived, and reduced to practice, a system and method for chatbot and search engine integration comprising chatbot crawler engine configured to detect all possible paths through a conversational flow between a chatbot and a user, and also comprising a chatbot search integration manager configured to receive a processed conversation flow from the chatbot crawler engine, parse the conversation flow to identify keywords and features, and build an indexable data structure which can be integrated into search engines in order to expose the information and data contained within the chatbot's knowledge base. This integration may allow search engine users to be redirected to a website hosting the chatbot when an indexed data structure comprises information relevant to a search engine query.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for an enhanced automated response systems testing platform 100. According to an embodiment, the platform 100 may comprise one or more services each of which is configured to provide automated response systems testing capabilities. The platform 100 and the one or more services may be cloud-based offerings which may be accessed by a network connection, such as the Internet using a webapp. According to some embodiments, the platform 100 and the one or more services may be stored and operated on a computing device comprising a memory and at least one processor capable of executing machine-readable instructions stored in the memory of the computing device. According to other embodiments, the platform 100 and the one or more services may be distributed across one or more computing devices communicatively coupled to each other, each computing device comprising a memory and at least one processor capable of executing machine-readable instructions stored in the memory of the one or more computing devices.

According to the embodiment, platform 100 comprises a chatbot testing service 200 configured to test a plurality of chatbots 152, 160 using automated agents following a test script, an automated customer response system duplicator service 300 configured to connect, via an appropriate communication network, with a contact center 150, communicate with an automated customer response system 151 of the contact center 150, navigate through the automated customer response system and record and store all communications, and then create a model which can recreate the contact center based on the mapping of the navigated automated customer response system, and an IVR crawler service 400 configured to provide various crawlers to facilitate automated test script configuration processes. The platform 100 can be used to support chatbot makers in training and quality assurance. The outputs of each service may be used as inputs to other services, such that the services, when operated together, provide a comprehensive testing platform for automated response systems. For example, data gathered, derived, or otherwise obtained during chatbot testing may be used by automated customer response system duplicator service 300 as a component when creating query and response trees of a contact center's 150 automated customer response system. Similarly, the data tree as created by automated customer response system duplicator service 300 may be utilized by chatbot testing service 200 in order to create a new test and/or determine where in a contact center's automated customer response system architecture additional testing may be beneficial to produce desired customer engagements and outcomes.

According to the embodiment, a platform 100 user may be a contact center 150 that wants to test its automated customer response system 151 and/or its chatbots 152. A platform user may also be any individual or enterprise (e.g., business, organization, research team, student group, etc.) that wishes to test both the functionality and quality of a chatbot 160 not necessarily associated with or operating in a contact center environment. In either case, platform users connect with the platform 100 using a suitable communication network such as the Internet. Chatbots 152, 160 may include, but are not limited to, Siri/Alexa-type voice bots, chatbots built into websites, standalone chatbots, and various other types of chatbots.

According to the embodiment, an IVR crawler service 400 is present on platform 100 and configured to provide call flow analysis of IVR systems using various crawlers each of which is configured to interrogate a specific type of IVR. IVR crawler service 400 can provide a complete library of test cases, execute test cases based at least in part on the from the various crawlers of IVR crawler service 400, and presents the results for review such as by a human analyst, or for storage in a database for further use at a later time.

Figure 2:
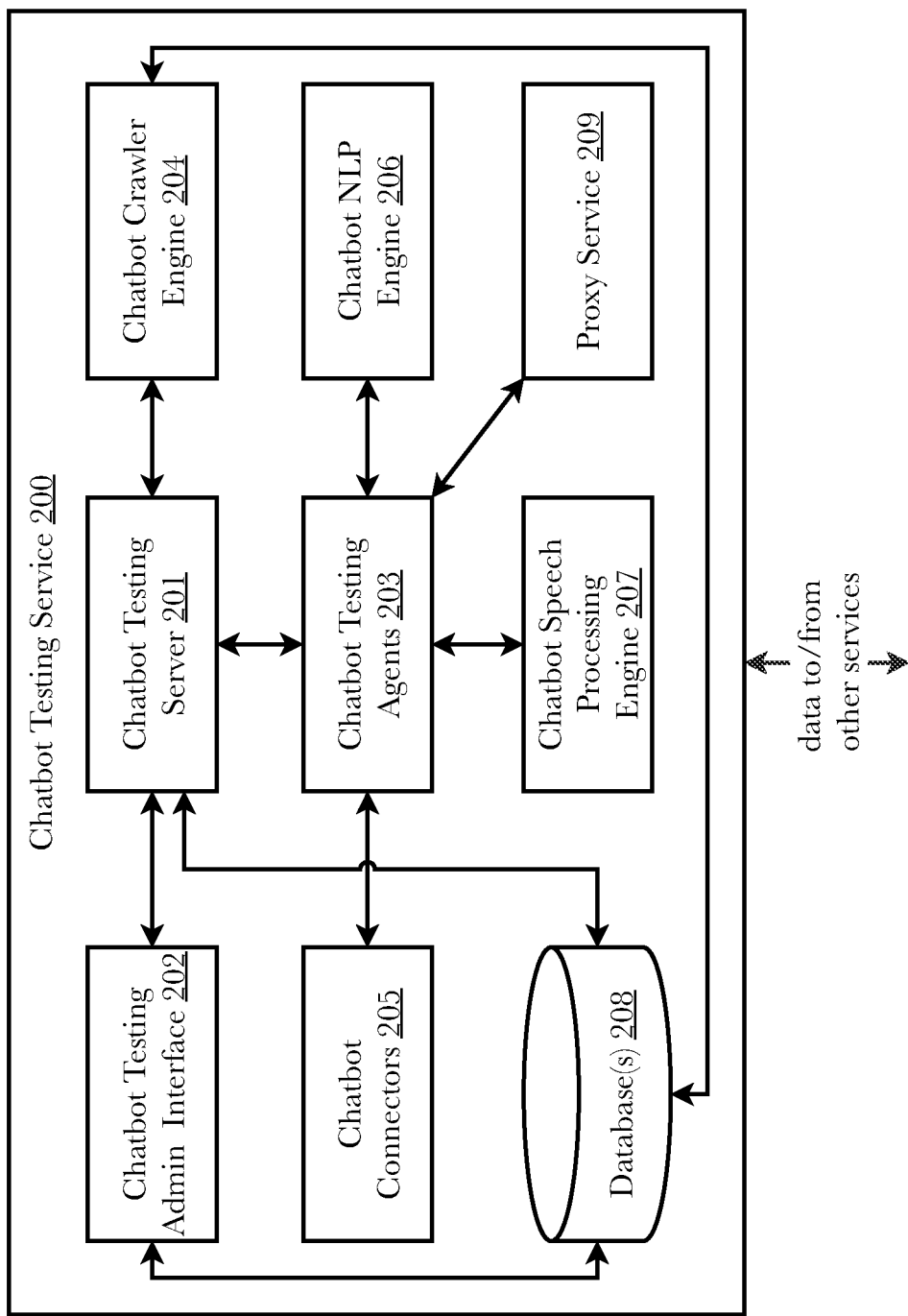
FIG. 2 is block diagram of an exemplary aspect of a platform for enhanced automated response systems testing platform, a chatbot testing service.

FIG. 2 is block diagram of an exemplary aspect of a platform for enhanced automated response systems testing platform, a chatbot testing service 200. According to an embodiment, chatbot testing service 200 is designed to provide a solution for automated holistic testing of chatbots in an enterprise infrastructure. Chatbot testing service 200 may be useful for developers, data scientists, chatbot designers, test automation engineers, DevOps engineers, operations or marketing groups, and project owners, to name a few. According to the embodiment, chatbot testing service 200 comprises at least a chatbot testing administrator interface 202, a chatbot testing server 201, a plurality of chatbot testing agents 203, a chatbot crawler engine 204, a plurality of chatbot connectors 205, and one or more database(s) 208. Additionally, chatbot speech processing engine 207 and chatbot worker coach 206 are present which can support chatbot testing agents 203 with advanced voice and speech testing.

According to the embodiment, chatbot testing service 200 may comprise chatbot testing server 201, a plurality of chatbot testing agents 203, a chatbot testing administrator interface 202, a plurality of bot connectors 205, and a chatbot crawler engine 204. Chatbot testing server 201 can be configured to provide an interface between chatbot testing agents 203 and chatbot testing admin interface 202 and is responsible for instantiating bot testing agents as they are needed and distributing them across available hardware. Furthermore, chatbot testing server 201 runs testing programs, which activate and deactivate, and configure, chatbot testing agents 203 as needed. According to an embodiment, chatbot testing server 201 is a server-side application and supports load-balancing over multiple instances as well as multi-tenancy.

According to the embodiment, chatbot testing admin interface 202 is a browser-based user interface that is configured to operate on all state-of-the-art browsers such as GOOGLE CHROME™, APPLE SAFARI™, MICROSOFT EDGE™, AND FIREFOX™ to name a few. Chatbot testing admin interface 202 allows platform users to configure, control, and monitor every aspect of their chatbot under test. Platform users can set up test cases and view a formatted summary about successful and failed test cases from previous or current platform 100 processes (e.g., contact center mapping, chatbot testing results data, IVR crawling results, etc.) which may be displayed and interacted with via chatbot testing admin interface 202. Admin interface 202 may provide enterprise features such as, for example, relational database support, multiple deployment options, monitoring, build pipeline integration, load balancing, security testing, performance testing, and the like.

According to the embodiment, chatbot testing agents 203 run the test cases for chatbots of interest. Usually, there are several testing agents 203 active for parallel execution of test cases. A scheduling engine may be used to act as a message queue and perform job scheduling for the chatbot testing agents as they are initialized by chatbot testing server 201. Test cases may be described by dialog (i.e., conversational) flows the chatbot is supposed to follow, also known as test scripts. Test scripts can be created by system users via admin interface 202 and may comprise user utterances and chatbot utterances. An utterance is any form of dialog which the test script creator wishes to test on the chatbot of interest. For example, a user utterance may be a simple "hello" to test the effectiveness of a given chatbot to responds to user greetings, and a chatbot utterance would be any appropriate (as defined by the test script creator) response to the "hello" greeting. Utterances can be grouped together into an utterance list, which allows for rapid testing of a plurality of various user and chatbot utterances. For example, a user utterance list comprising various greetings may comprise utterances such as "hello", "Hi", "how are you", "can you help me", and the like. The use of such lists allows for test script creators to create more robust test cases which are capable of testing a dynamic range of dialog flows. Test scripts may comprise a dialog flow and one or more configuration files which can indicate testing conditions, a chatbot connector to be used to perform the test, a desired conversational depth, and other parameters that define the test case environment. Test scripts may be stored in a database 208 either individually, or as part of a larger test case which may comprise one or more test scripts. Storage of test scripts and/or test cases allows for existing test cases/scripts to be adapted to reflect new test parameters without the need for a platform 100 user to create entirely new test cases/scripts for different (e.g., updated, etc.) chatbots. Because test scripts are generally dialog flows, they can be written as, for example, a plain text file with any text editor, an Excel file, a comma-separated-value (CSV) file, JSON, YAML, Markdown files, and more. In other words, a test may be scripted, pre-defined or pre-recorded conversations written as a test script. A conversation can consist of a collection of: user inputs which are sent to the chatbot, chatbot responses which are expected to be received from the chatbot, asserters and logic hooks to add advanced assertion or conversation flow logic, and scripting memory to set and get variables, respectively. If there are any differences in the bot responses from the pre-recorded scripts, the script returns a failure notification which can be viewed using admin interface 202.

Chatbot testing service 200 provides a variety of ways to augment test sets (e.g., test case, test scripts, etc.) in order to enable more robust testing capabilities for chatbots. One such augmentation is the humanification of test sets. Humanification aims to simulate human behavior or habits during live chatbot testing in order to verify the chatbot's ability to follow a conversation flow because most human users do not act like a computer script. Platform 100 users are able to choose to add an additional humanification layer to test scripts to evaluate how a chatbot deals with typical human typing habits. Chatbot testing service 200 can provide a plurality of humanification algorithms which can be selected during test script configuration via admin interface 202. Examples of humanification algorithms include, but are not limited to, typing habits: case sensitivity, duplicate space, emojis, enter instead of space, missing punctuation mark, and common typographic errors: double character, homophones, mishit, missing character, mixing character, qwertz vs. qwerty keyboard, sausage fingers, shift characters, and more. Users (e.g., test set creators) can even set a percentage of how many utterances will undergo the humanification. Additional humanification options include simulating delayed user input by allowing users to define an amount of time to wait to reply, and simulating human typing speed. If a humanification augmentation is selected, it will be included in the one or more configuration files associated with a test script such that during test script execution by chatbot testing agent 203 the humanification augmentation will be applied to the conversational flow between testing agent and enterprise chatbot.

Chatbot testing service 200 can also provide end-to-end (E2E) testing for chatbot user interfaces. Testing the user experience end-to-end has to be part of the every test strategy. Apart from the conversation flow, which is best tested on an API level, it has to be verified that a chatbot published on a company website works on commonly used end user devices. The special challenges when doing E2E tests for chatbots are the high amount of test data needed, which can exceed 100,000 utterances for a medium sized chatbot, and the slow execution time—in an E2E scenario tests are running in real time. The good news for testing device compatibility is that a small subset of test cases is sufficient. Writing an automation scripts is usually a time-consuming task, but chatbot testing service 200 can assist in writing an automation script for a chatbot widget embedded on a website and speeds up the development process by providing parameterizable, default configuration for adapting it to a given chatbot website with specially designed selectors and pluggable code snippets. An example of selectors and snippets may include: a website address to launch for accessing the chatbot, selector for identification of the input text field, selector for identification of the "Send"-button (if present, otherwise message to the chatbot is sent with "Enter" key), selector for identification of the chatbot output elements, code snippets for additional steps to do on a website before the chatbot is accessible (e.g., mouse clicks), and capabilities for device or browser selection or other specific settings.

Chatbot testing service 200 can also provide voice testing (e.g., voice-enabled chatbots) capabilities. When testing voice apps, all of the methods described above for text-based testing apply as well. Some voice-enabled chatbot technologies natively support both text and voice input and output, such as GOOGLE DIALOGFLOW™ or AMAZON LEX™. Others are working exclusively with voice input and output, such as Alexa Voice Service™. All other technologies can be extended with voice capabilities by using speech-to-text and text-to-speech engines in the processing pipeline such as chatbot speech processing engine 207. For more complex tests the chatbot response has to be available as text to use text assertions. One benefit of using voice instead of text as input to test cases is if there are historic recordings available when transitioning from a legacy IVR system. Such libraries can be leveraged for valuable test data.

Chatbot testing service 200 can also provide natural language understanding (NLU) and/or NLP testing via chatbot NLP engine 206. Platform 100 supports all relevant conversational AI technologies available, with new technologies being added to the platform with weeks of release. A plurality of chatbot connectors 205 are available for testing purposes, including adaptable generic connectors for custom conversational AI APIs. While it is state-of-the-art for conversational AI to use some kind of NLP technology in the background, not all those APIs disclose this NLP information to API clients. Specifically, the information chatbot NLP engine 206 requires for analytics is the predicted intents and entities, intent and entity confidences, and an alternate intent list. To test the conversational AI a user can select the appropriate chatbot connector 205 to connect the conversational AI with chatbot NLP engine 206 by providing the appropriate endpoint addresses, keys or secrets and additional technology specific information. For more information on testing NLU/NLP systems associated with a conversational AI, please refer to FIG. 7.

Present in chatbot testing service 200 are a plurality of chatbot connectors 205 wherein each connector type is configured for a specific kind of chatbot technology. Chatbot connectors 205 allow chatbot testing service 200 to connect to live chatbots with chatbot testing agents 203 for testing and quality assurance. For example, voice connectors may be present which may comprise an automated speech recognition component for transmitting audio to and from various voice bots as well as a text-to-speech component for sending and receiving text from agents. Similarly, text connectors may be present which are configured for text-chat bots. As another example, consider that a lot of chatbots connect to a simple HTTP/JSON based API in the backend to handle user requests and prepare responses. A generic HTTP(S)/JSON chatbot connector 205 may be used to enable chatbot testing service 200 and testing agents 203 to connect to such an API. Other types of connectors may be present for different kinds of bots that may be tested by platform 100. Chatbot connectors 205 may also be configured to integrate with a plurality of open source and/or enterprise bots including, but not limited to, Microsoft Azure Bot Service, IBM Watson Assistant, Amazon Alexa Voice Service, Facebook chatbots, smartphone apps, and various other bot services.

According to the embodiment, a chatbot crawling engine 204 is present and configured to enable platform 100 users to automatically detect all paths in a conversation flow which can then be saved as test cases and utterance lists, and then be used as a base for a regression test set. Chatbot crawling engine 204 can be thought of as a special type of agent that does not run test cases but rather "explores" a chatbot's internal conversational architecture to build test cases. Chatbot crawling engine 204 can build a map of the paths (e.g., a map of a single path/flow and/or a map of one or more paths/flows) that can be followed by the chatbot, and use these flows to create test cases. During operation chatbot crawling engine 204 locates all the conversation flows in a tested chatbot and then crawls through each flow until all conversational flow paths have been explored. It can detect quick replies and buttons and simulate clicks on all the options and follow the paths until it reaches the configured conversation depth or found an open-ended question. The conversation flows are persisted to database 208 where they can be used in future test cases or for automated response system mapping as facilitated by automated customer response systems duplicator service 300.

Chatbot crawling engine 204 can allow for chatbot crawlers to be created, configured, and deployed. A created chatbot crawler may be linked to an existing or new chatbot via chatbot connector 205 and then configured for operation. Examples of crawler configurations may include, but are not limited to, conversation start messages, maximum conversations steps (i.e., the depth of the conversation in the conversation flow), number of welcome messages (for use with chatbots that initiate the conversation without user interaction), wait for prompt (e.g., a defined timeout the crawler will wait for bot messages after each simulated user message), exit criteria, merge utterances (e.g., crawler can recognize non-unique utterances and merge them into one utterance), and selectable agents which allows for a crawler to be assigned to a specific chatbot testing agent 203.

According to the embodiment, chatbot test scripts may comprise asserters and logic hooks. Asserters are additional validators for conversations with chatbots. For example, if a platform user wants to check if the links sent by the chatbot are valid references, the platform user, when writing the test script, can call an asserter called HyperLinkAsserter, which is configured to try to reach the sent links. A plurality of asserters are available on chatbot testing service 200, via chatbot testing admin interface 202, which may be configured for various types of assertions including, but not limited to: asserting Hyperlink existence, availability and response in a chatbot response; asserting with custom HTTP/JSON API requests; asserting SQL database content, and more. Logic hooks can be used to inject custom application programming interface (API) content into chatbot testing service 200. For example, a logic hook can be used to call a custom Hypertext Transfer Protocol (HTTP) API and inject the response content into the platform processing pipeline. As another example, a logic hook can be used for scripting memory such as in order to "remember" a response from a chatbot (e.g., an order number, customer account number, etc.). Logic hooks can be placed into any part of the test script, except for the bot section. Both asserters and logic hooks can be enabled and configured by a platform user during test script creation.

Chatbot testing service 200 may further comprise a chatbot NLP engine 206 and a chatbot speech processing engine 207 which may support advanced testing capabilities of specifically configured chatbot testing agents 203. Chatbot NLP engine 206 may be configured to provide natural language processing (NLP) analytics using state-of-the-art machine learning libraries (e.g., SciPy, Pandas, NLTK, NumPy, Keras, etc.) available for various programming languages such as, for example, Python. Examples of the types of analytics that may be conducted by chatbot NLP engine 206 include, but are not limited to, utterance similarity, keyword analytics, sentence embeddings, sentiment analysis, summarization, topic modeling, text classification, lemmatization and stemming, and more. Chatbot speech processing engine 207 may be configured to support advanced voice testing of chatbots using state-of-the-art open source voice technology. Chatbot speech processing engine 207 can provide speech-to-text functionality, test-to-speech functionality, and adding voice effects and layers to audio recordings for the purpose of testing the robustness of chatbot systems.

According to some embodiments, database 208 may be any suitable database or data storage technology known to those skilled in the art. In this embodiment, database(s) 208 are structured query language (SQL) relational databases.

Chatbot testing service 200 may optionally comprise a proxy service 209 which can operate between the chatbot testing service 200 and the chatbot services under test and configured to check chatbot APIs for the open web application security Project® (OWASP) top ten security threats.

Chatbot testing service 200 may further comprise a load balancer, a storage engine, and a scheduler engine. A load balancer may be present and configured to operate between the client browser and platform 100 that routes client requests to the available backend services and detects and reacts to unavailable instances. In an on-premise environment, typically an Nginx is used to perform load balancing processes. In a cloud environment, there is typically a vendor-specific technology available such as, for example, elastic load balancer in the Amazon web services (AWS) cloud. A storage engine may be present between chatbot testing server 201 and database(s) 208 which provides a scalable persistence layer that provides intuitive and safe ways to read and write data to database 208. An example of a storage engine that may be used in an embodiment of chatbot testing service 200 is the open source Prisma offering. According to an embodiment of chatbot testing service 200, a scheduler engine may be present and configured to provide a reliable communication and job processing queue between chatbot testing service 200 components, for example, scheduling a plurality of chatbot testing agents 203 on available hardware to perform test scripts. An example of a scheduling engine that may be used is the open source Redis system.

Figure 3:
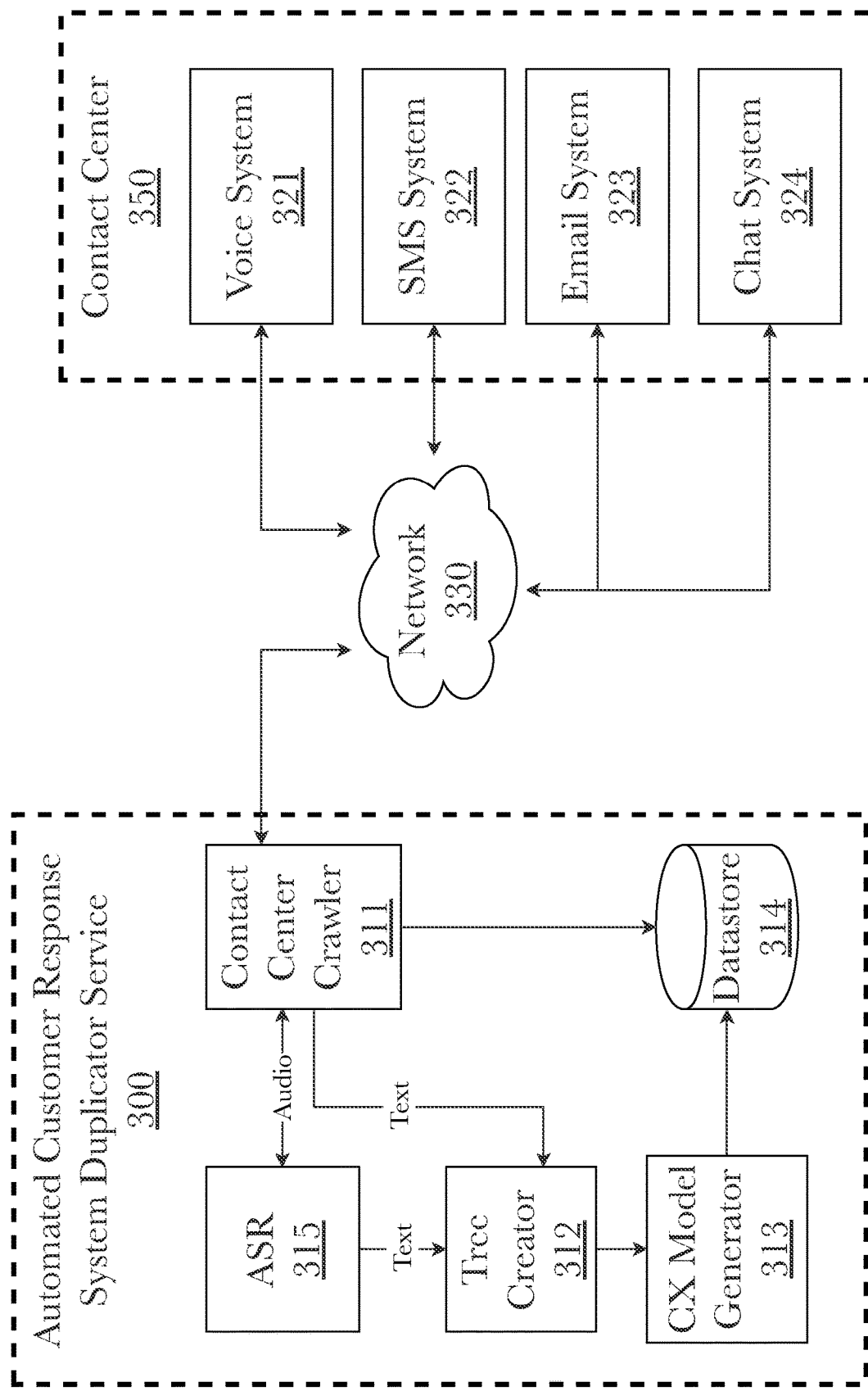
FIG. 3 is block diagram of an exemplary aspect of a platform for enhanced automated response systems testing platform, an automated customer response system duplicator service external to a contact center.

FIG. 3 is a system diagram illustrating an exemplary architecture for an aspect of an enhanced automated response systems testing platform 100, an automated customer response system duplicator service 300 external to a contact center 350. A contact center code translator 310 is a computer system containing several software components and able to communicate over a network 330 with components of a contact center's automated customer response system. For audio communications, the connection may be made over a public switched telephone network (PSTN) system or voice over Internet protocol (VOIP) connection. Certain text-based communications such as email and chat may be made using an Internet connection, while other text-based communications such as short message service (SMS) texts made be made through a mobile phone connection. Software components inside of a contact center code translator 310 include a contact center crawler 311, a tree creator 312, a CX model generator 313, a datastore 314, and an automated speech recognition (ASR) engine 315. A contact center crawler 311 may connect to a contact center's 320 automated communications such as interactive voice response (IVR) system 321, and may also crawl and interact with a contact center's SMS system 322 if applicable, email system 323 if applicable, and online text chat system 324 if applicable. A contact center crawler 311 interacts with these services using appropriate Application Programming Interface (API) or other network communications to simulate a customer contact with the system and recognize and select every option presented by the automate customer response system, many of which follow similar structures but have different content or depths to menus and options, which may be crawled by the system. For audio communications, the contact center crawler 311 records the audio (i.e. voice prompts) in a database 314 simultaneously passes the audio to an automated speech recognition (ASR) system 315, which converts the audio into text and passes the text back to the contact center crawler 511 for interaction with the IVR system 321. As the contact center crawler 311 selects options, responses received from the IVR 321 for each option selected are recorded in the database 314 and sent to the ASR 315 for conversion into text, which is then passed to the tree creator 312. For text-based automated customer response systems 322, 323, 324, the ASR 315 is not required, and the contact center crawler 311 can directly select options based on the text and pass text responses received to the tree creator 312 for processing (while also simultaneously storing the options and responses in the database 314). During the crawl of the contact center 320, a tree creator 312 is fed the data for what options led to further options, their relationships, and the responses received, and the necessary steps and selections required for each branch of the automated customer response system tree, building a tree data structure of the automated communications with the contact center 320. The data structure is then fed into a CX model generator 313 which generates programmatic code representing the tree in a data model format such as a textual representation of data such as but not limited to a JavaScript Object Notation (JSON) string or other data graph or tree or map models, before storing in a datastore 314. Many methods for converting data structures to various object and graph model formats are known to the art, and "toModel" or similar methods in Object Oriented Programming (OOP) are quite common, relying on the interpretation of nested or tree data and formatting it with brackets so as to make it both easily parsed by computers and humans alike. The system as shown may be capable of both "crawling" the responses of a voice system with automated voice recognition, and with separately extracting received data and forming abstract models in the form of data objects, maps, graphs, database entries, or other forms of data storage and structure, for the purposes of representing the crawled voice system as a model of an IVR system.

Figure 4:
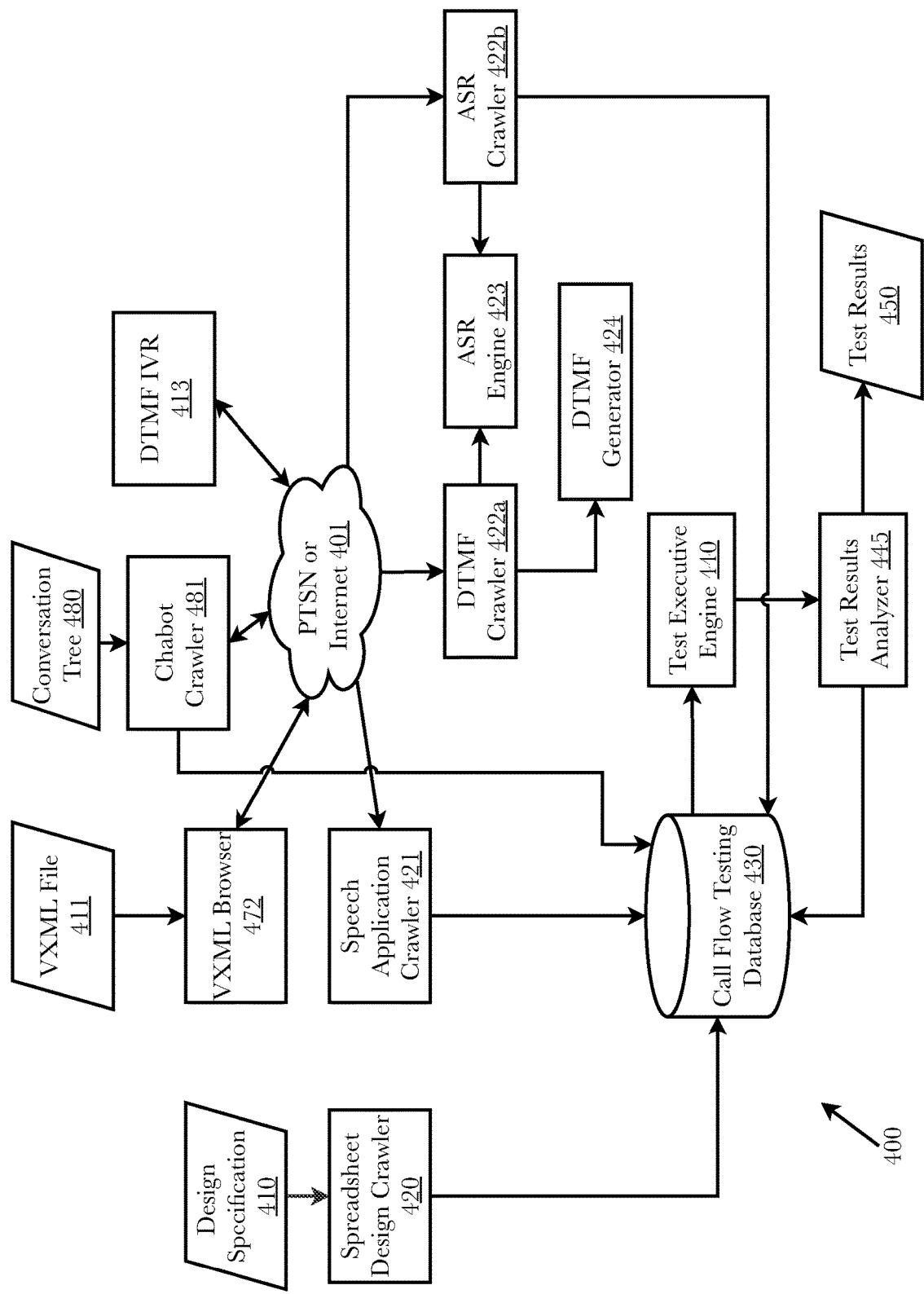
FIG. 4 is a block diagram of an exemplary aspect of an enhanced automated response systems testing platform, an interactive voice response (IVR) crawling service.

FIG. 4 is a block diagram of an exemplary aspect of an enhanced automated response systems testing platform 100, an interactive voice response (IVR) crawling service 400. According to the aspect, IVR crawling service 400 may comprise a speech crawler 421 that may be a VXML-based crawler stored and operating on a network-connected computing device (such as a server or a desktop workstation), an IVR crawler that may be a dual-tone multifrequency (DTMF) crawler (DC) 422*a* (for example, a touch-tone based interaction program or ASR/NLSR speech application crawler (ASC) 422*b* that may be an automatically generated utterance based interaction program (as may be utilized interchangeably or simultaneously, according to the nature of the audio input received or operation being performed), a design crawler 420 that may be a spreadsheet-based software crawler, a call flow database 430 that may store and provide call flow documentation or records such as those generated by the crawlers of the invention, a test executive engine 440 that may perform call flow testing according to known call flow records, and a test results analyzer 445 that may perform analysis of the results of performed call flow tests such as to determine the performance of an IVR or the accuracy of a call flow documentation record, is disclosed. According to the embodiment, a speech application crawler (SAC) 421 may be a process that interrogates a target VXML browser 472, may then reverse engineer any discovered call flows (as described below) by parsing each branch of the VXML application (such as by providing all possible inputs at all possible layers) and builds a complete test case library. The input may be the URL of the target VXML file 411 and the output may be a file containing the test cases in XML format, such as for storing in a database or adding to documentation files.

A DTMF crawler (DC) 422*a* may be a process that interrogates a target touch tone IVR or IVRs 413 that aren't VXML compliant (or whose VXML interface is not accessible) by placing actual telephone calls to an IVR 413 from the crawler platform via a telephone network 401 such as a public switched telephone network (PSTN) or cellular network such as a GSM or CDMA radio communications network. The crawler may then, as described previously, reverse engineer any discovered call flows such as by parsing each and every branch of the application by providing all possible DTMF inputs via a DTMF generator 424 (such as may be utilized to generate DTMF tones to signal a telephone input without requiring a physical key press, as is appropriate for software-based applications) at all possible layers, and may then build a complete test case library. This solution includes use of transcription to convert audio to text for the test cases, for example by utilizing an automated speech recognition (ASR) engine 423 so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases or a diagrammatic representation of the IVR application structure suitable for adding to documentation or storing in a database.

An ASR/NLSR speech application crawler (ASC) 422*b* may be a process that interrogates a target ASR/NLSR speech-based IVR or IVRs 413 that aren't VXML compliant (or who's VXML interface is not accessible) by placing actual telephone calls to an IVR 413 from the crawler platform via a telephone network 401 such as a public switched telephone network (PSTN) or cellular network such as a GSM or CDMA radio communications network. The crawler may then, as described previously, reverse engineer any discovered call flows such as by parsing each and every branch of the application by providing all possible DTMF inputs via a speech utterance (Text to speech) generator 424 (such as may be utilized to generate simulated customer spoken utterances without requiring a live human speaker, as is appropriate for software-based applications) at all possible layers, and may then build a complete test case library. This solution includes use of transcription to convert audio to text for the test cases, for example by utilizing an automated speech recognition engine 423 so that the software-based crawler may parse and respond to heard voice prompts from the IVR via the telephone call. The input may be a phone number, or multiple numbers (internal or external, such as for testing internal IVR applications or remotely testing external IVRs from outside the internal telephone network), and the output may be a library of test cases suitable for adding to documentation or storing in a database.

A chatbot crawler 481 may a process that crawls through a conversation tree (e.g., conversation flow) 480 detecting each possible conversation path in order to build a plurality of test cases for the chatbot testing service 200. In such an arrangements, the crawler can traverse conversation flows, clicking on buttons and quick replies, in order to generate a flow chart and conversation for each pathway.

A design crawler 420 may be a process that interrogates a standard speech application design template 410 used commonly in the art to build a complete library of test cases for the speech/DTMF application. In such an arrangement, the crawler may traverse a design document 410 such as a spreadsheet, and as described previously may reverse engineer any discovered flows from the document and output a test case library suitable for incorporation into either a database or IVR documentation, or both.

According to the embodiment, a crawler may perform reverse-engineering of call flows discovered during operation, generally by interacting with an IVR system to explore available call flow options, identify menu prompts, or identify call flow endpoints (for example, when an IVR directs a caller outside of the IVR system, such as to a contact center agent or a voice recording system to leave a message). For example, a DTMF crawler (as described above) may place a call to an IVR by dialing an access number as a customer would. Upon reaching the IVR, the crawler may record a menu prompt, and identify available options such as through integration with ASR engine 423 to infer choices for input (for example, "for department A, press 1"). The crawler may then provide input corresponding to a menu choice, for example by producing the audio tones appropriate to simulate a numerical key press on a telephone handset. This operation may continue throughout a call flow by listening to a menu prompt, identifying available choices, inputting a choice, and listening to a new prompt as the crawler progresses through an IVR system. When an endpoint is reached, such as when a call is routed to an agent or other system external to the IVR, the crawler may conclude that particular call flow, document it appropriately (such as by producing VXML data, human-readable documentation describing the call flow, or providing data for use in a test case as described below), and may then optionally call back to the IVR and continue traversing the call flows by selecting new input choices. For example, an entire IVR system may be traversed in this manner by iteratively selecting the next available choice for each menu prompt, starting with the last menu (as may be identified from a previous call flow, by recognizing when the call flow ended and the call was routed, and identifying the menu prompt immediately prior to that as the "last" one). In this manner, some or all of an IVR system may be reverse-engineered efficiently and automatically.

As illustrated, a test executive engine 440 may execute test cases based at least in part on stored or received input from the various IVR crawlers of the invention, and may present the results of test execution to a test results analyzer 445 for analysis. The resulting analyzed test results 450 may then be presented for review such as by a human analyst, or for storage in a database for further review at a later time or for future incorporation into addition analysis operations.

It should be appreciated that the IVR crawling service 400 of the invention may incorporate multiple crawlers and crawler types such as those described above, interchangeably or simultaneously as may be desirable for a particular arrangement or application.

For example, a contact center with a number of IVR applications already in place may need to document their call flows and introduce test cases to audit operation. In such an arrangement, one or more types of IVR crawlers may be utilized to traverse and document an existing IVR setup from scratch, generating new documentation and test cases during operation. Similar approaches may be used to add documentation or test cases where previously there were none, allowing the documentation and testing of "in-place" or production systems, with no prior documentation needed.

In another exemplary arrangement, a contact center may wish to migrate to a new IVR system, for example during a change of ownership or locale, or a system upgrade. In such an arrangement, the contact center may utilize one or more types of IVR crawlers to traverse and document an existing IVR configuration, so that they may use this documentation as a starting point for rebuilding after the migration. Additionally, a crawler may be used to produce a plurality of VXML data describing the existing configuration, and suitable for importation into an IVR system. During the migration operation, this VXML data may then be imported into the new IVR system, effectively cloning the previous configuration in the new system and greatly expediting the overall migration process. Optionally, the new system may be audited using test cases or documentation produced prior to migration, ensuring the migration did not introduce any errors or corrupt data.

In another exemplary arrangement, a number of IVR crawlers may be used by a contact center in a continuous operation to continually or periodically traverse an IVR system, producing documentation for any changes as they are found. In such an arrangement, crawlers may keep IVR documentation current with regard to the state of an IVR configuration, for example to reflect changes made to menu prompts that might affect call flows. Additionally, test cases may be kept up-to-date as well, ensuring that changes made to call flows do not break testing operations unexpectedly, as well as ensuring that test cases may be used to audit any new changes.

Figure 5:
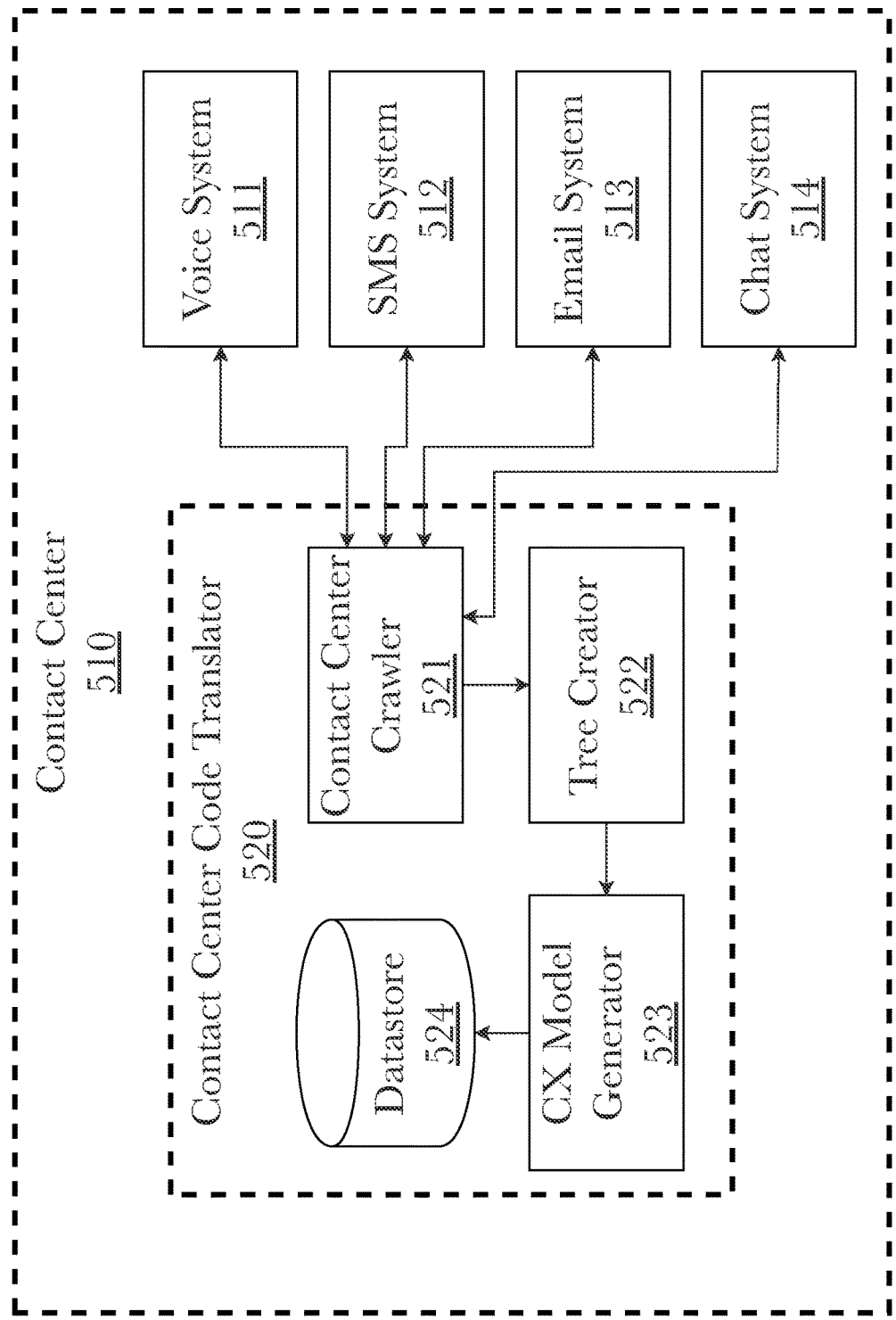
FIG. 5 is another system diagram illustrating an exemplary system for automated customer response mapping and duplication internal to a contact center.

FIG. 5 is another system diagram illustrating an exemplary architecture for an aspect of an enhanced automated response systems testing platform 100, an automated customer response mapping and duplication service 300 internal to a contact center. In this embodiment, the service does not require external network connections, and can interact directly with the automated customer response systems 511-514. A contact center code translator 520 is, in an exemplary embodiment, a computer system containing several software elements and able to communicate internally with a contact center 510 and the automated communication systems inside the contact center. Software components inside of a contact center code translator 520 include a contact center crawler 521, a tree creator 522, a CX model generator 523, and a datastore 524. A contact center crawler 521 may connect to a contact center's 510 automated communications such as Automated customer Response (IVR) system 511, and may also crawl and interact with a contact center's SMS system 512 if applicable, email system 513 if applicable, and online text chat system 514 if applicable. A contact center crawler 521 interacts with these services using appropriate Application Programming Interface (API) or other network communications such as a Local Area Network (LAN) or Wide Area Network (WAN) to simulate a custom and go through every option available in their automated communications, especially an IVR 511, many of which follow similar structures but have different content or depths to menus and options, which may be crawled by the system. During the crawl of the contact center 510, a tree creator 522 is fed the data for what options led to further options and their relationships, terminating nodes, and the necessary steps and syntax to get to each node discovered, building a tree data structure of the automated communications with the contact center 510. The data structure is then fed into a CX model generator 523 which formats the tree or other graph of options in a compatible data model format, such as being converted automatically by a data parser or object converter available in many object oriented programming languages, before storing in a datastore 524. Many methods for converting data structures to specified object formats such as graphs or trees are known to the art, and "toObject" or similar methods in Object Oriented Programming (OOP) are quite common, relying on the interpretation of nested or tree data and formatting it with brackets so as to make it both easily parsed by computers and humans alike. Not shown in this diagram is the automated speech recognition (ASR) system shown in the previous diagram, which operates as previously described. The system as shown may be capable of both "crawling" the responses of a voice system with automated voice recognition, and with separately extracting received data and forming abstract models in the form of data objects, maps, graphs, database entries, or other forms of data storage and structure, for the purposes of representing the crawled voice system as a model of an IVR system.

If access to the back-end code of a contact center 510 that provides and makes up the voice, SMS, email, and chat systems 511, 512, 513, 514 is provided to a contact center crawler 521, or crawler 521 is located inside a contact center 510, crawler 521 may instead be configured to crawl and create a CX model for the contact center IVR systems based on the actual code present, rather than probing and mapping responses received.

According to an embodiment, a CX model is a specific type of data model, derived from a tree graph or tree data model, or thought of in another way, a CX model is a subset of tree data or graph models. The nodes and content of a CX model contain specially formatted and designed code with which a customer contact center's automated response system or text-based communication systems may be initialized and rebuilt with the specific tree of queries and responses as outlined in the CX model. The programming language, if any, or formatting of the queries and responses in a proprietary code or format, may be that of a commonly used programming language such as PYTHON™, C#™, JAVA™, or others, or may be a custom-designed format that may be recognized by an automated response system or related system to construct or reconstruct the specified automated response system according to the model.

Figure 9:
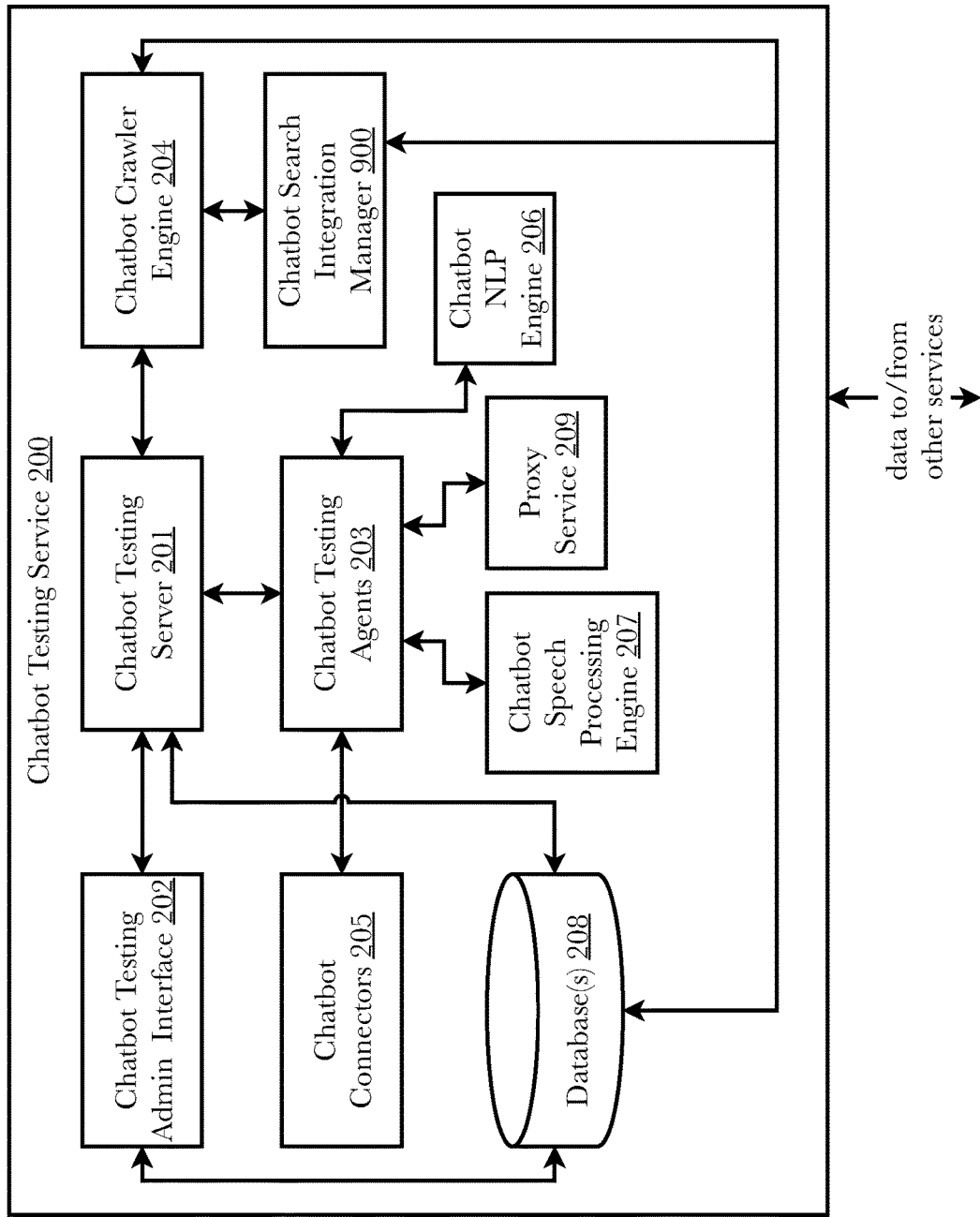
FIG. 9 is a block diagram illustrating an exemplary embodiment of the chatbot testing service further comprising a chatbot search integration manager.

FIG. 9 is a block diagram illustrating an exemplary embodiment of the chatbot testing service 200 further comprising a chatbot search integration manager 900. According to the embodiment, chatbot search integration manager 900 is configured to enable chatbot conversations to be indexable for search engines. Generally, search engines build a search index by crawling content that is available as a website (e.g., in HTML), however, chatbot content is typically kept inside a chatbot engine. Chatbot search integration manager 900 can find this information and unlock it by making the chatbot content searchable by external sources (e.g., via a search engine query). Chatbot crawler engine 204 can provide, to chatbot search integration manager 900, one or more conversation flows (e.g., a flow path and/or conversation) generated by chatbot crawler traversing every possible path in a chatbot conversation tree. Chatbot search integration manager 900 may analyze the one or more conversation flow content in order to index the content as required in order for the chatbot content to be searchable by search engines. For a more detailed description of chatbot search integration manager 900 architecture and functionality, please refer to FIG. 10 below.

Figure 10:
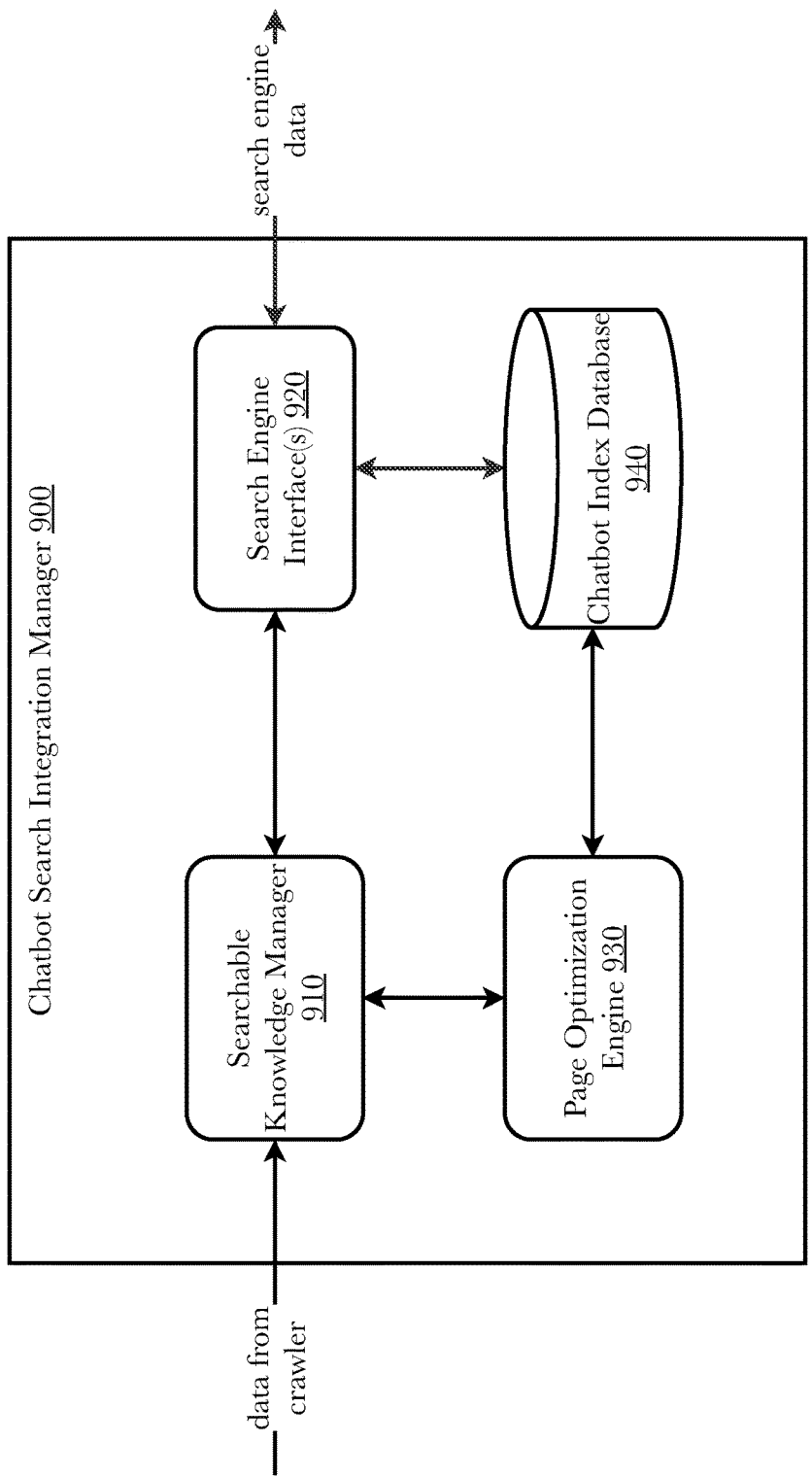
FIG. 10 is a block diagram illustrating in more detail an aspect of the chatbot testing service, the chatbot search integration manager.

FIG. 10 is a block diagram illustrating in more detail an aspect of the chatbot testing service 200, the chatbot search integration manager 900. According to an embodiment, chatbot search integration manager 900 may be configured to convert a chatbot conversational architecture (as discovered by chatbot crawler engine 204) and information into static HTML pages that comprises all content discovered within a given chatbot's knowledge base. A chatbot's knowledge base may comprise information such as chatbot responses to user messages, chatbot training data, utterance files, knowledge graphs which capture relationships between entities and events, and other such information. Enterprise chatbots contain a lot of valuable information and data that can be extracted by chatbot crawlers during a conversation, which involves interfacing with the chatbot and reaching a certain depth in the conversation flow. Chatbot crawler engine 204 provides a tool for traversing all possible conversation outcomes (i.e., conversation paths) of a conversation flow and chatbot search integration manager 900 provides processes for converting the information and data in a conversation path to an indexable format and builds a bridge between enterprise chatbots and search engines which allows chatbot content to be viewable on search engine results pages, directing search engine users to the website hosting the enterprise chatbot. Alternatively, instead of directing users to the website, the information which answers the search engine query may be displayed on the results page of the search engine. Chatbot search engine 900 has several configurable options including, but not limited to, adding custom vocabulary for unknown words, and questions and answers to ignore.

According to an embodiment, chatbot search integration manager 900 may comprise one or more search engine interfaces 920, a searchable knowledge manager 910, a page optimization engine 930, and a chatbot index database 940. These components may be operated on one or more computing devices (e.g., server, desktop computer, etc.) comprising a memory and at least one processor, wherein there are machine executable instructions stored in the memory and executable by the at least one processor, which causes the one or more computing devices to perform the functionality described herein. In some embodiments, the one or more computing devices may be distributed in different locations such as in a cloud computing infrastructure. In some embodiments and aspects, each of these components may not necessarily be required in order for chatbot search integration manager 900 to function within the scope of the present disclosure.

According to the embodiment, one or more search engine interfaces 930 are present and configured to provide a single entry point providing access to content of a chatbot index. It may act as an intermediary between a search engine and chatbot index database 940 allowing users to send queries as well as display, sort, and save results. In some embodiments, there may be a plurality of search engine interfaces 920 each of which may be specifically configured to interface with a specific search engine such as, for example, GOOGLE™, MICROSOFT BING™, YAHOO™, BAIDU™, DUCK-DUCKGO™, and WOLFRAM ALPHA™, to name a few. According to some aspects, search engine interfaces 930 may comprise or may act as an API gateway which receives search engine data (i.e., search engine query) and runs code to retrieve the relevant data from chatbot index database 940 or to direct the search engine user to an enterprise website where a chatbot is located that can answer the search engine query.

According to the embodiment, a chatbot index database 940 may be present and configured to store a plurality of information and data including, but not limited to, data related to received search engine queries, static HTML webpages as generated by searchable knowledge manager 910, and training and test datasets which can be used by page optimization engine 930 in order to construct one or more machine learning algorithms configured to determine the optimal static HTML page format that results in high page ranks. According to some embodiments, chatbot index database 940 may be any suitable database or data structure including, but not necessarily limited to, non-relational databases, cloud databases, object-oriented database, key-value databases, graph databases, and hierarchical databases, to name a few. Additionally, chatbot index database 940 may comprises one or more different types of databases.

According to the embodiment, searchable knowledge manager 910 may be configured to perform chatbot knowledge base indexing processes such as, for example, text acquisition, text transformation, and index creation. Searchable knowledge manager 910 may communicate with chatbot crawler engine 204 in order to receive as input the conversation flows associated with a given chatbot. Furthermore, searchable knowledge manager 910 may provide additional instructions to chatbot crawler engine 204 in instances when a more thorough crawling of parts of the chatbot knowledge base is needed. For example, for test case purposes it might be enough to capture all the conversation paths that a chatbot is likely to use, but for indexing purposes there may be a node in a particular conversation path that has many informational variants (for example, when scheduling flights there might be a node for choosing origination and one for destination). For testing purposes, it would not be necessary to walk through all the airports that may be stored in the chatbot knowledge base, but for indexing purposes this can be important as there may be a search query that says "Flights from Munich" would result in a highly-ranked search result derived from the chatbot knowledge base. Searchable knowledge manager 910 can instruct chatbot crawler engine 204 to traverse deeper into a conversation path to support indexing processes and to extract more data from a chatbot's knowledge base.

Searchable knowledge manager 910 may receive the conversation flows (e.g., conversation paths) for a particular chatbot as generated by chatbot crawling engine 204 and identify the text in the flow. The conversation flows may be received as a flowchart graph structure comprising nodes connected by edges. Each node may comprise one or more words either representing an user utterance (e.g., a statement, question, response, etc.) or representing a chatbot response to a user utterance. Searchable knowledge manager 910 can utilize graph traversal algorithms to traverse the flowchart. It may then parse the flow to transform the conversation into index keywords and features. Furthermore, it may take the indexed keywords and features created by the text transforms and create data structures that support fast searching. One example of such a data structure may be a static HyperText Markup Language (HTML) webpage for search engine crawling. Search engine interface 920 is configured to instruct search engines how to find and crawl the resulting static HTML webpages. This static HTML webpage may not be visible to the public, but when interfaced with a search engine, search engine interface 920 may direct the search engine to the webpage where the enterprise chatbot is located, or it may show the results contained within a static HTML webpage directly in response to a search engine query.

According to the embodiment, a page optimization engine 930 is present and configured to use one or more machine learning algorithms to optimize the design (e.g., format, structure, etc.) of static webpages exposed to search engines in order to improve static page rank. According to an aspect, page optimization engine 930 may conduct targeted searches using important keywords and view the results of how the generated static webpages get ranked by a search engine, and then learn the optimal way to structure static web pages to deliver improved search results derived from a chatbot's knowledge base. For a more detailed description of page optimization engine 930, please refer to FIG. 11 below.

Figure 11:
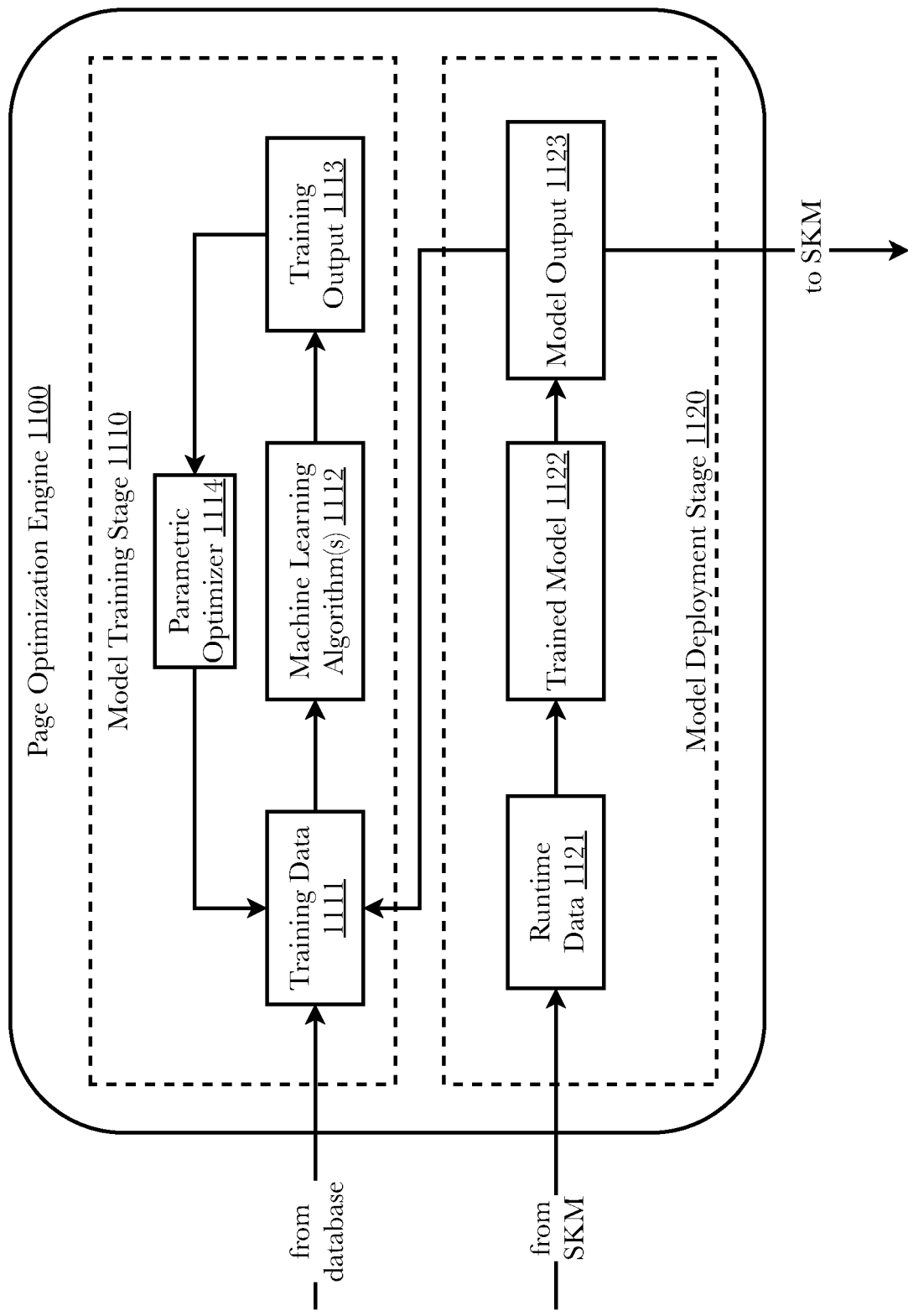
FIG. 11 is a block diagram illustrating an exemplary architecture for a page optimization engine, according to an embodiment.

FIG. 11 is a block diagram illustrating an exemplary architecture for a page optimization engine 1100, according to an embodiment. According to the embodiment, page optimization engine 1100 may comprise one or more machine learning algorithms 1112 configured to optimize the structure of static webpages generated by searchable knowledge manager 910 in order to improve the page ranking assigned to a static page by a search engine. Page optimization engine 1100 may comprise two stages: a model training stage 1110 wherein the one or more machine learning algorithms 1112 may be trained and tested using a feedback loop until the one or more machine learning algorithms 1112 produce the desired training output 1113, and a model deployment stage 1120 wherein the fully trained model 1122 as configured in the model training stage 1110 is deployed to operate on runtime data 1121 in a production environment.

At the model training stage 1110, a plurality of data may be retrieved from chatbot index database 940 and or database(s) 208, formatted to be used as training dataset(s) and a test dataset, and inputted into the one or more machine learning algorithms 1112 in order to produce training output 1113. Training data 1111 may, for example, include, but is not limited to, a dataset of static webpages and for each static page its page rank as determined by a search engine, and keywords and highly ranked static pages that contain that keyword. This training data may be used as input into one or more machine learning algorithms 1112 so that the one or more machine learning algorithms can produce a model that improves the page rank of static webpages by learning optimal static page structure. The training output 1113 of each training loop may be passed through a parametric optimizer 1114 which may be an autonomous or semi-autonomous (e.g., human operator can adjust algorithm parameter values) component capable of performing algorithm parameter and hyperparameter tuning in order to train the one or more machine learning algorithms 1112 to produce the desired training output 1113. A few non-limiting examples of parameters/hyperparameters that may be adjusted via parametric optimizer 1114 can include: train-test split ratio of data, learning rate (e.g, gradient descent), choice of optimization algorithm (e.g., gradient descent, stochastic gradient descent, Adam optimizer, etc.) choice of activation function in a neural network layer (e.g., Sigmoid, ReLU, Tan h, etc.), cost or loss function value, number of hidden layers, number of activation units in each layer, dropout rate, number of iterations in training, kernel or filter size for convolutional layers, pooling size, batch size, coefficient values, weights and biases, and cluster centroids in clustering algorithms. After algorithm parameters have been updated by parametric optimizer 1114, another training session loop is performed and the training output 1113 is checked again to verify if the algorithm(s) performance increased. This process may be repeated as required until the training output 1113 is satisfactory. At that point, the one or more machine learning algorithms 1112 have now produced a trained model 1122 that can optimize the structure of static pages, and such a model may be deployed to operate on non-training data.

According to an embodiment, the machine learning algorithms 1112 may be deep learning algorithms. According to some embodiments, the machine learning algorithm 1112 is a neural network configured to receive as input a keyword or static webpage, such as a static HTML webpage generated by searchable knowledge manager 910, and to output an optimized structure for the static page. During the training stage 1110 the neural network may be trained on datasets of static webpages and the page rank assigned to each static page by a search engine. The neural network can use the hidden layers within its structure to extract the features of a static webpage that lead to greater page rank scores. Once learned, these extracted features can be used to improve the structure of static webpages generated by searchable knowledge manager 910 in order to improve the page rank assigned by a search engine. This improves the visibility and detectability of the chatbot knowledge contained within a generated static webpage and improves the integration between a search engine and a given chatbot.

According to an embodiment, there may be one or more trained models 1122 and each of the one or more trained models 1122 may be related to a specific conversational and/or chatbot domain. Examples of domains can include, but are not limited to, small talk, banking, travel, insurance, customer support, security, etc. Domain specific models may be used to generate static webpage structures that are domain specific and thus formatted to achieve the highest page rank as assigned by a search engine. During the training phase 1110 training data would be sourced from and labeled as a specific domain so that the one or more machine learning algorithms 1112 may be trained to output domain specific static page structures.

In the model deployment stage 1120, runtime data 1121 in the form of generated static webpages received from searchable knowledge manager (SKM) 910 may be fed as input into the trained model 1122 to produce model output 1123 in the form of static webpage structure. The model output 1123 may be sent to SKM 910 which can use the received structure to update the inputted static webpage to reflect the outputted structure. Additionally, the static pages structed according to model outputs 1123 along with the page rank assigned to such static pages may be used as additional training data 1111 for the model training stage 1110. In this way, the trained model 1122 and its underlying one or more machine learning algorithms 1112 may be continuously trained and updated to reflect model performance. Model outputs 1123 may also be sent to chatbot index database 940 or database 208 for storage and further use by other system components.

Detailed Description of Exemplary Embodiments

Figure 6:
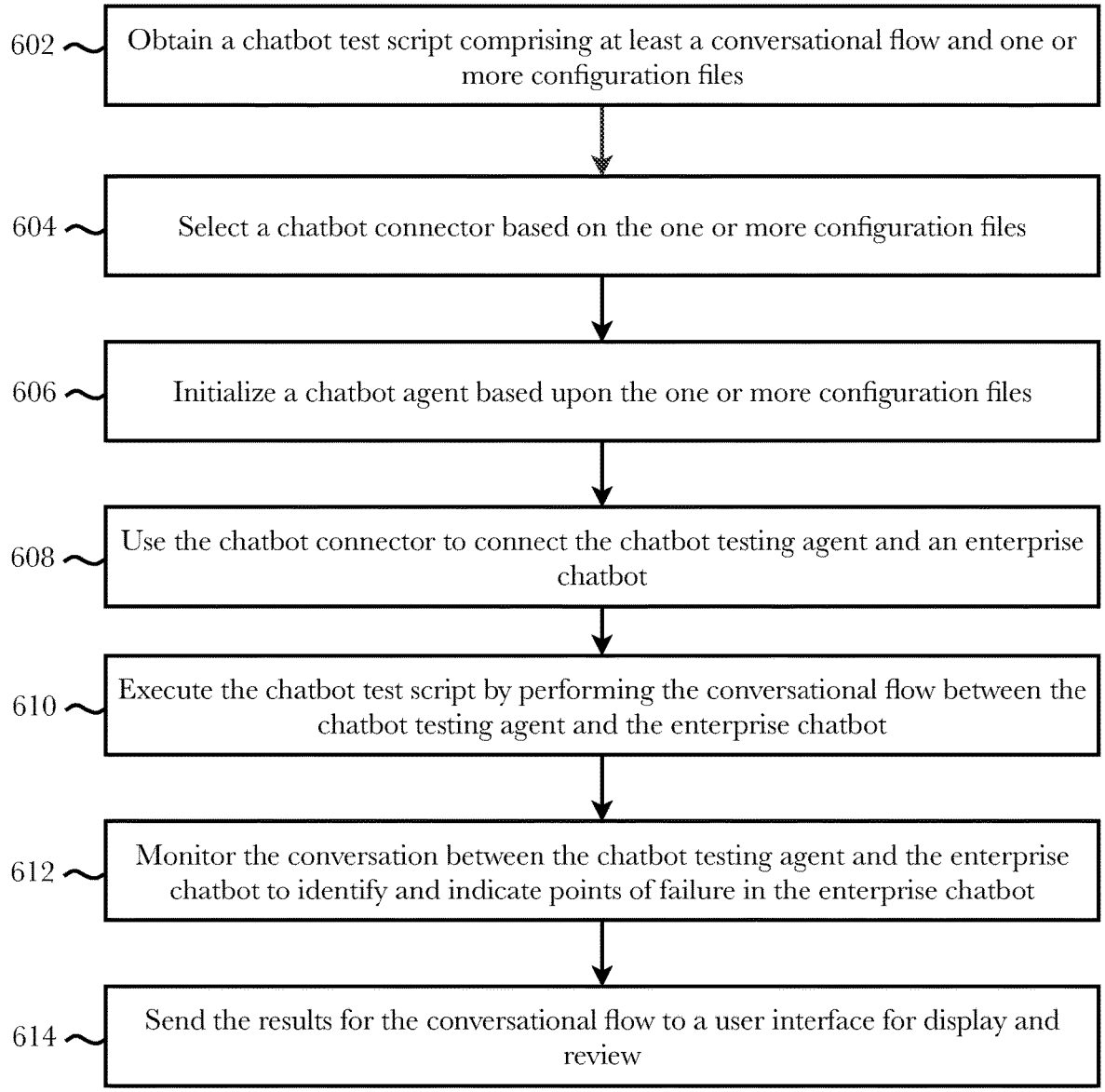
FIG. 6 is a flow diagram illustrating an exemplary method for automated chatbot testing, according to an embodiment.

FIG. 6 is a flow diagram illustrating an exemplary method for automated chatbot testing, according to an embodiment. According to an embodiment, the process begins when chatbot testing server 201 receives, retrieves, or otherwise obtains a test script comprising at least a conversational flow and one or more configuration files 602. Test scripts may be obtained from database 208 or from other services operating on platform 100 such as IVR crawler 400. Test scripts may be created and defined by a platform 100 user via admin interface 202. Alternatively, test scripts can be autonomously curated by other services operating on platform 100. Once a test script is obtained, chatbot testing server 201 can then select a chatbot connector 205 based on the one or more configuration files 604. A specific chatbot connector may be defined by the test script creator and may be specific to the chatbot and/or voice assistant technology which is to be tested. Chatbot connector may be selected from a list of pre-configured chatbot connectors. Once the appropriate chatbot connector has been selected, chatbot testing server 201 may then initialize a chatbot testing agent 203 to execute the test script based upon the one or more configuration files 606. One or more chatbot testing agents may be initialized to provide parallel execution of multiple test scripts. Chatbot testing agents may be specifically configured computer programs (e.g., computer instructions, etc.) capable of autonomous and continuous operation and responsible for performing the appropriate action to conduct a chatbot test case. The selected chatbot connector is then used to connect the initialized chatbot agent with an enterprise chatbot, the enterprise chatbot being the subject of the test case 608. Once connected, chatbot testing agents 203 may then execute the chatbot test script by performing the conversational flow between the chatbot testing agent 203 and the enterprise chatbot 610. Performing the conversational flow may comprise the chatbot agent sending an utterance, possibly from a list of utterances, to the enterprise chatbot, and receiving a reply to the utterance from the enterprise chatbot. During step 610 chatbot testing server 201 is continuously monitoring the conversation between the chatbot testing agent and the enterprise chatbot to identify and indicate points of failure in the conversational flow based on the responses received from the enterprise chatbot 612. In other words, the test script contains agent utterances which have corresponding enterprise chatbot utterances that are to be used to respond to chatbot agent utterances. If, during a test case, an enterprise chatbot does not respond with one of the possible utterances, as indicated by an enterprise chatbot utterance list, then that indicates a test failure for that given conversational flow, and the utterances that led to that failure can be flagged so that they may be viewed by the person who created the test script to conduct test case analysis and test script updating, if needed. As a last step 614, the results of each test case (i.e., execution of one or more test scripts) may be sent to a user interface for display and review by a platform 100 user.

Figure 7:
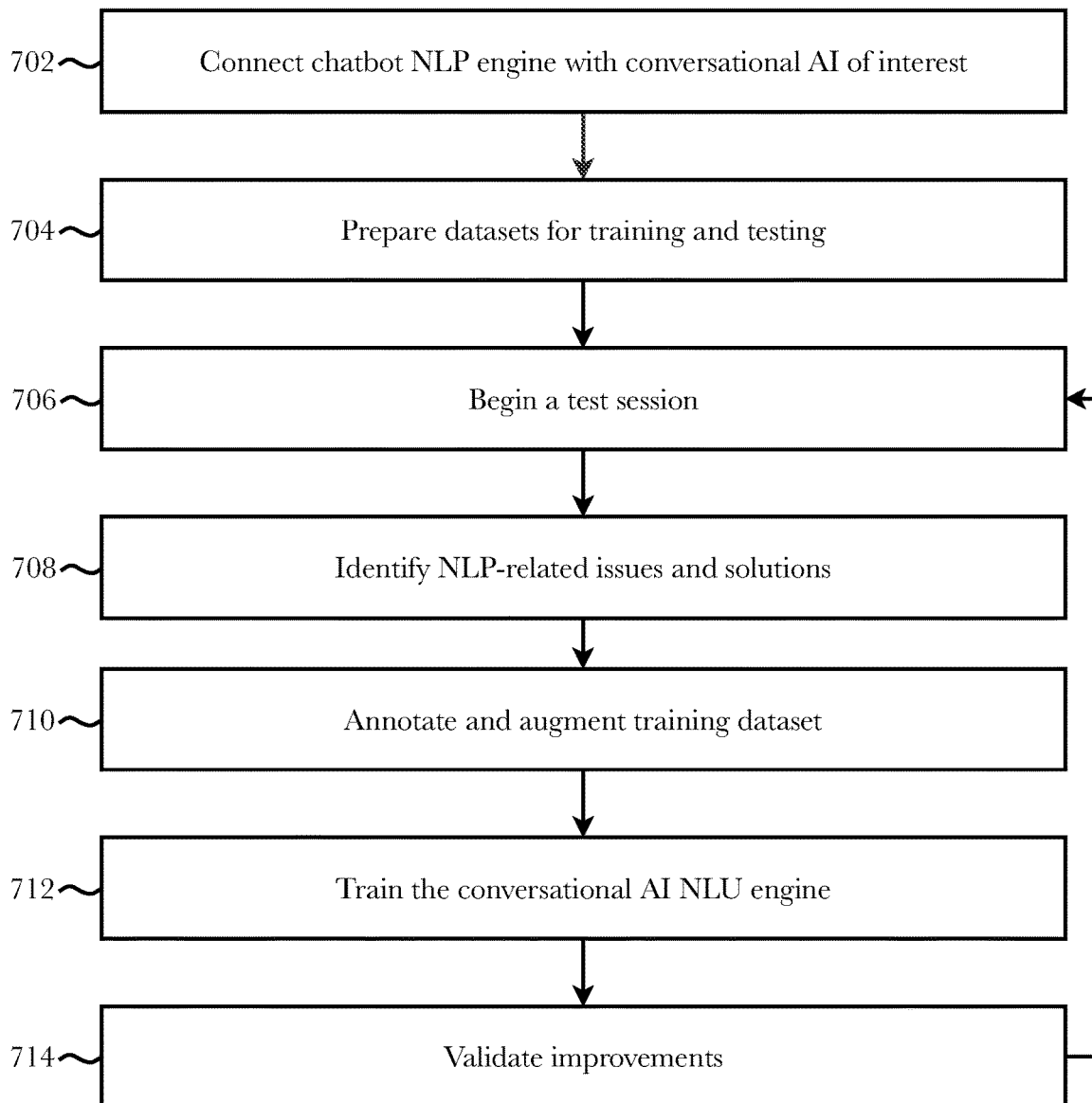
FIG. 7 is a flow diagram illustrating an exemplary method for NLU/NLP testing, according to an embodiment.

FIG. 7 is a flow diagram illustrating an exemplary method for NLU/NLP testing, according to an embodiment. According to the embodiment, chatbot testing service 200 can provide testing of NLU/NLP systems associated with a conversational AI (e.g., enterprise chatbot). A platform 100 user can access the admin interface 202 in order to create a conversational AI test set (e.g., one or more test cases and/or test scripts). The process begins at step 702 by connecting the chatbot testing engine 206, via a chatbot testing agent 203, with a conversational AI of interest by selecting an appropriate chatbot connector 205 related to the conversational AI of interest, or by configuring one of the available adaptable generic connectors for custom conversational AI APIs. A test message may be sent between the chatbot agent 203 and the conversational AI of interest in order to verify a connection has been made.

Upon confirmation of a connection, the next step is to prepare datasets for training and testing purposes 704. This step is where most of the effort is involved: the machine learning algorithms involved in NLP, most state-of-the-art NLP engines are based on some kind of machine learning, are only as good as the data they have been trained on. Quantity and quality of datasets are both important considerations when constructing training and testing datasets. Platform 100 has a variety of tools that support in gathering and augmenting datasets for training and testing. For example, platform 100 includes a test case wizard to download the conversation model of a given NLP provider and convert it to test scripts for test cases which can be used by chatbot NLP engine 206 instantly. The test case wizard options available may be dependent upon the chatbot connector 205 and its associated NLP engine. Depending on the NLP engine of interest, a user can decide to: only import intent names and user examples as utterance lists, generate conversation files with NLU intent asserters, and generate conversation files with NLU intent and entity asserters. Another tool the test case wizard provides is a dataset splitter which is configured to divide a dataset into two pieces such one of the two pieces is used as a training dataset and the other piece is used as a test dataset. A default split may be set according to the 80/20 rule: use 80% of available data for training, and 20% for testing. Additionally, platform 100 provides a plurality of built-in datasets available for use in testing and training an NLP engine of interest. The built-in datasets comprise more that 70,000 user examples in more than twenty different languages covering over forty domains (e.g., small talk, banking, travel, insurance, customer support, security, etc.). No matter the source of the dataset, the training data should be labeled data, in other words each utterance has a known intent.

Once the training and test datasets have been created and curated, the next step is to begin a test session 706. The test session will execute based on the configuration files associated with the test set. After a test session is complete, the user can view the results, via admin interface 202, of the test session such as failed and successful dialog flows. Chatbot NLP engine 206 can analyze the performance of the test data with the NLP engine of interest based on one or more quality metrics in order to identify NLP-related issues and solutions at step 708. Chatbot NLP engine 206 records all test data and calculates important NLP analytics automatically. Admin interface 202 visualizes the NLP quality metrics and suggests steps for improving it. It can indicate any pieces of the test data that either did not return the expected intent, did return the expected intent but with a low confidence score, or did not return the expected intent, but with a confidence score close to another's intent. The confidence score may be a value between the inclusive range of 0.0-1.0. In other embodiments the confidence score may be an integer value between 1-10.

Examples of quality metrics that may be calculated by chatbot testing service 200 include, but are not limited to: a confusion matrix comprising measurements of precision, recall, F1-Score, and accuracy for each test case, which shows an overview of the predicted intent (as columns) versus the expected intent (as rows); entity confidence deviation which is a measure for the bandwidth of the predicted confidence score for all utterances of an entity and is calculated as the standard deviation of the confidence scores; entity utterance distribution which shows the utterances per predicted entity; intent confidence deviation which is a measure for the bandwidth of the predicted confidence scores for all utterances of intent and is calculated as the standard deviation of the confidence scores; intent confidence risks which show the intents of the test set with the weakest average confidence score wherein a low average confidence score may indicate deficiencies in training data such as single utterances having a high impact on the average or that the training data is not specific enough for the NLU engine; and intent mismatch probability which indicates utterances with a high confusion probability based on confidence score.

Visualizations for each quality metric may be constructed and displayed, via admin interface 202. For example, a histogram illustrating the intent confidence distribution may be produced for easy viewing of test session results. Chatbot NLP engine 206 is able to identify alarming events such as, but not limited, predicted intent does not match the expected intent, entities have not been recognized, and test data is not suitable for analyzing with chatbot NLP engine 206. Chatbot NLP engine 206 can detect any issues with the test results and suggest actions which will improve the overall NLU performance. It can indicate, based on the one or more calculated quality metrics, which intents require more training data, and if test data is not suitable for performing NLU tests with it. The results of a test session can be downloaded as CSV, JSON, and Excel for further processing, the list contains user examples, predicted intent and confidence score, extracted entities and confidence score, and expected intent and entities.

After reviewing the results of the test session and receiving the suggested actions for improvement, the next step 710 is to annotate and augment the training dataset to improve the NLU performance. Examples of suggestions and actions that can be performed to augment the training data can include, but are not limited to, add additional user examples for specific intents, remove user examples from intents, and move user examples from one intent to the other. A paraphraser tool may be present which can quickly generate new user examples based on given ones. The result is a big number of additional smaller user examples to use for further training. The next step 712 is to train the NLU engine of interest. In the test case wizard a user can select the dataset that was just augmented in the last step and upload the user examples to the NLU engine of interest. This will cause the training to be conducted autonomously. Manual training is also possible if the user desires such scenario by exporting the dataset as single ZIP file and use it to train the NLU engine of interest.

The last step is to validate improvements in the NLU performance. This is performed by returning to step 706 to start a new test session using the newly trained NLU engine of interest. Chatbot NLP engine 206 offers the option to combine the visualizations of two test sessions so that a user can view the results of a previous test session side-by-side with the results of a current test session in order to quickly compare the performance of the NLU engine of interest after the latest round of training/testing. This process can be repeated as many times as necessary until all the intents have a score higher than some user defined threshold such as, at a minimum, 75%. A high performance NLP model will have a score at or above 90%. In this way, platform 100 and chatbot testing service 200 can provide NLU/NLP testing capabilities for conversational AI technologies.

The method described in FIG. 7 may be leveraged to provide self-healing capabilities to conversational AI technology. Using the monitoring capabilities of chatbot NLP engine 206 the efficacy of a chatbot may be monitored in real time for decreasing confidence values and perform triage to identify what is causing the confidence values to lower. In the case of insufficient training data for certain topics, chatbot NLP engine 206 can automatically augment the training data and upload it for the next round of training. In some embodiments, chatbot NLP engine may augment use cases based on knowledge of the biggest and most popular language models. Oftentimes, the big language models have a lot of information about them available, information such as areas where the language model excels areas where the language model is deficient. Using this information about language models, chatbot NLP engine 206 can predict potential coverage issues (e.g., chatbot struggles to determine intent in the travel domain, etc.) and augment training data in advance in order to mitigate the failure rate and save time by creating more robust training data to overcome the coverage issues. The system may leverage stored and enterprise specific data in order to augment training data as necessary. For example, call recordings, IVR recordings, ticketing systems, historical session data, and the like may be used as a starting point for data augmentation. The desired outcome is that chatbot testing service 200 is able to minimize error rates by augmentation during the design stage. In this way, chatbot testing service 200 can detect, solve, deploy, and confirm the fix of a problem semi-autonomously, providing self-healing capabilities for conversational AI technologies.

Figure 8:
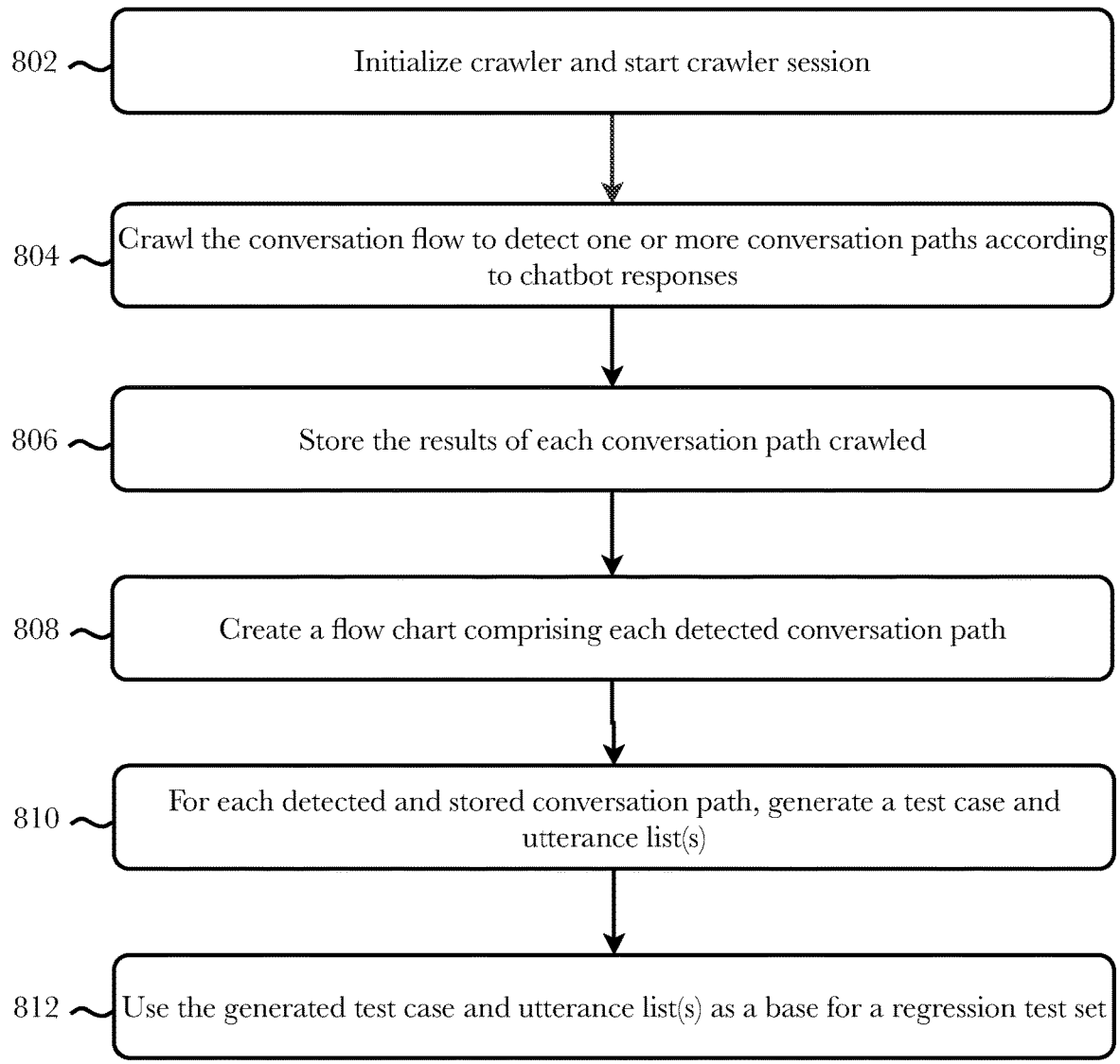
FIG. 8 is a flow diagram illustrating an exemplary method chatbot crawling, according to an embodiment.

FIG. 8 is a flow diagram illustrating an exemplary method for chatbot crawling, according to an embodiment. According to an embodiment, a chatbot crawler engine 204 may be used to facilitate automated chatbot test case generation capabilities of chatbot testing service 200. Generally, writing test cases and maintaining them is a big challenge in software development in terms of labor and time, and this holds true for chatbot development. To reach the best coverage it is necessary to define all possible conversations for a given conversation model (e.g., chatbot) which is time consuming and is fallible to human error for simple chatbots and complex chatbots alike. Chatbot crawler engine 204 provides a solution to the limitations described above by allowing a platform 100 user to create, configure, and deploy a chatbot crawler which can be used to automate the processes of detecting all paths in a conversational flow between a chatbot testing agent 203 and the chatbot of interest.

The process begins at step 802 when a platform 100 user starts a crawler session by creating and configuring a chatbot crawler to analyze a conversation flow. As described above, a user must first choose the chatbot technology to use and then configure the connection to that chatbot channel using chatbot connector 205. In some cases a user need not create and configure a crawler, but can select from previously created crawlers stored in database 208. A crawler may be configured based on a plurality of configuration parameters including for example, but not limited to, conversation start messages which indicate to the crawler where in the conversation flow to begin crawling at each loop, maximum conversation steps which indicate the depth of the conversation in the conversation flow that when reached stops the conversation, number of welcome messages, wait for prompt which defines a timeout until the crawler has to wait for each chatbot message, exit criteria which can be used to exclude certain parts of the conversation tree, and merge utterances which allows the crawler to recognize non-unique utterances and merge them into one utterance.

In some embodiments, chatbot crawler engine 204 may automatically initialize, configure, and deploy a chatbot crawler. Once a crawler session has been started the chatbot crawler will locate the locate the 'conversation start message' and crawl the conversation flow to detect one or more conversation paths according to chatbot responses 804. The crawler detects the buttons and the quick replies and makes conversations along them. The conversation tree can be traversed by a customized depth first algorithm. Each time the crawler reaches an open-ended question (e.g., no button or quick reply is found), then the conversation is ended, the path is marked as visited and a new conversation is started from the beginning (e.g., from the 'conversation start message') to keep the conversation context safe. When all the paths are visited in the conversation tree, then the session is ended and each conversation path is stored for further use 806. For each path detected, there may be a flow chart and conversation (e.g., the sent messages and chatbot responses) generated which describe the conversation path. Chatbot crawler engine 204 may create a flow chart of the conversation flow comprising each detected path's flow chart at step 808. This flow chart may be displayed, via admin interface 201, after a crawler session has completed along. The flow chart shows the whole detected conversation tree in visual form to let users get a bit clear picture about the chatbot of interest. There may be indications on the flow chart which indicate certain actions may be required to fix potential errors in a given conversation path. For example, a yellow exclamation mark may be used to indicate that more user responses are required or to mark a certain chatbot message as an end of conversation.

For each detected and stored conversation path, chatbot crawler engine 204 can generate a test case and/or utterance list(s) based upon the stored conversation (e.g., the sent messages and chatbot responses) at step 810. This conversations represent test scripts which can be grouped into a test set for the selected chatbot. A test set is collection of test cases which can be added to a test project. The generated test case and utterance list(s) may be used by chatbot testing service 200 as a base for regression testing of the chatbot 812.

Figure 12:
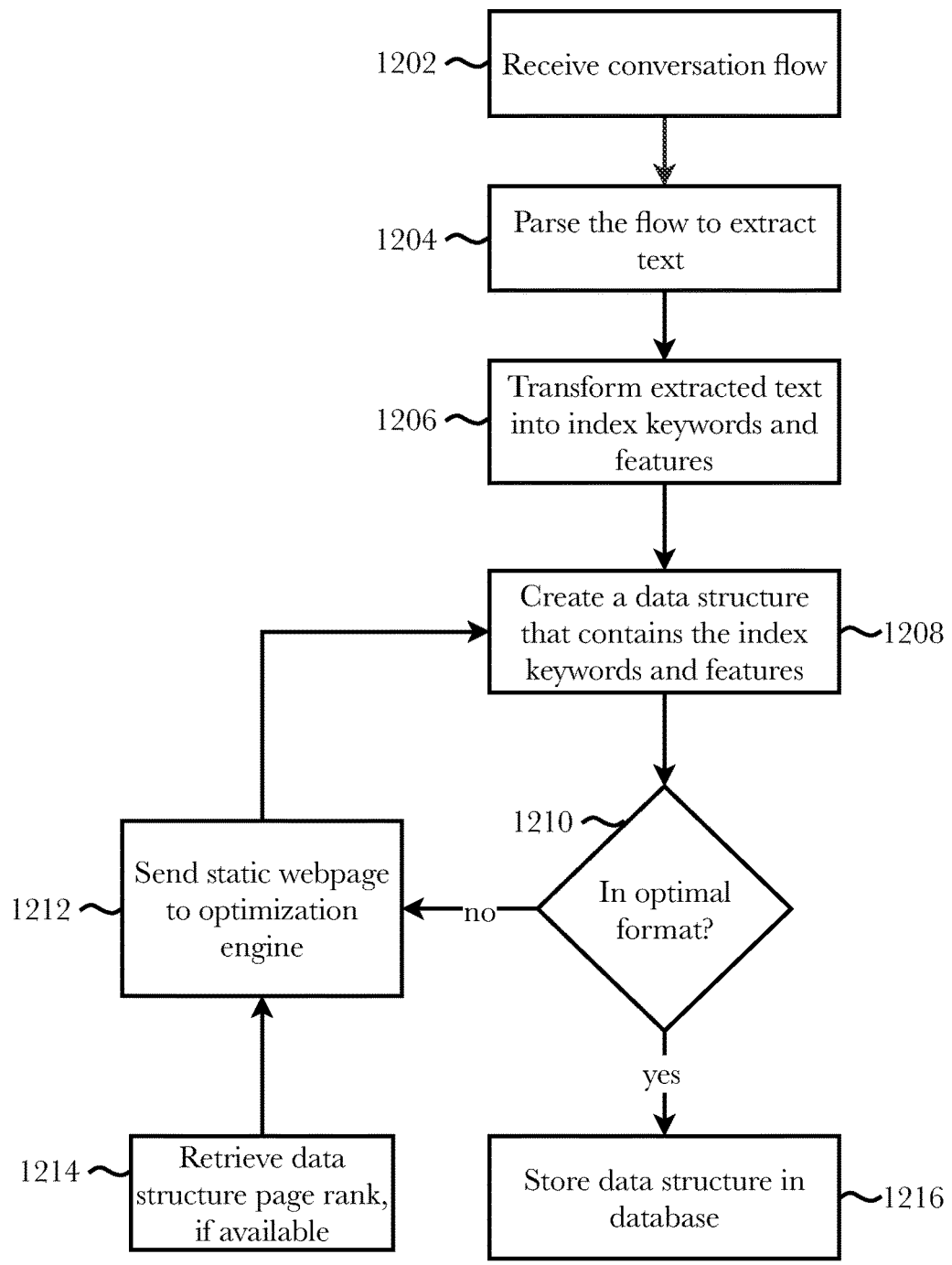
FIG. 12 is a flow diagram illustrating an exemplary method for creating an indexable data structure from a conversational flow, according to an embodiment.

FIG. 12 is a flow diagram illustrating an exemplary method for creating an indexable data structure from a conversational flow, according to an embodiment. According to the embodiment, the process begins at step 1202 when search knowledge manager (SKM) 910 receives, retrieves, or otherwise obtains a conversation flow either directly from chatbot crawler engine 204 or from database 208. A conversation flow may comprise a single conversation path or more than one conversation path and represents a conversation between an enterprise chatbot and a user. In some embodiments, the user may be a chatbot testing agent 203 configured to converse with the enterprise chatbot according to a test case (e.g., test script, utterance list, etc.). A conversation flow may be formatted as a flow chart comprising nodes, which represent user or chatbot statements, and edges between the nodes which represent the direction of the conversation. In other embodiments, a conversation flow may be formatted as a text file comprising the entire conversation and annotated to indicate which party (e.g., user or enterprise chatbot) accounted for each statement contained therein. In either case, the next step 1204 as performed by SKM 910 is to parse the flow to extract the text. In the case where the conversation flow is in a flow chart format, SKM 910 may utilize a graph traversal algorithm to parse and extract the text from each node in the flow chart. As a next step 1206, SKM 910 can transform the extracted text into index keywords and features. The extracted keywords may be dependent upon the domain in which the received conversation flow falls under. For example, the domain of travel might have keywords related to 'booking', 'scheduling', and 'lodging', whereas the domain of customer support might have keywords related to 'customer retention', 'billing', and 'account settings'. The transformation of text to keywords may be based on the domain associated with a conversation flow, and the domain of a conversation flow may be logically associated with a conversation flow as it is generated by chatbot crawler engine 204.

At step 1208 SKM 910 creates a data structure that comprises the index keywords and features. According to some embodiments, the data structure is a static HTML webpage. The created data structure may be checked if it is in an optimal format at step 1210. This check may be based on an assigned page ranking associated with the data structure, if a page rank is available, by determining if the assigned page rank is higher than some predetermined threshold. If the data structure is not in an optimal format, then it may be sent to page optimization engine 930 at step 1212. Page optimization engine 930 may input the received data structure (e.g., static webpage) into a trained model 1122 in order to produce as output an optimized static webpage format which will improve the page rank assigned to the data structure. Optionally, if the data structure already has an assigned page rank, then it may retrieved 1214 at step 1212 and used as an additional input along with the data structure into the trained model 1122. The outputted optimized data structure format may be sent back to SKM 910 which can create a new data structure for the received conversation flow based on the model output at step 1208. The newly created data structure may be checked again to determine if it is in optimal format. If it is, then, as a last step 1216, the data structure may be stored in a database such as chatbot index database 940.

Figure 13:
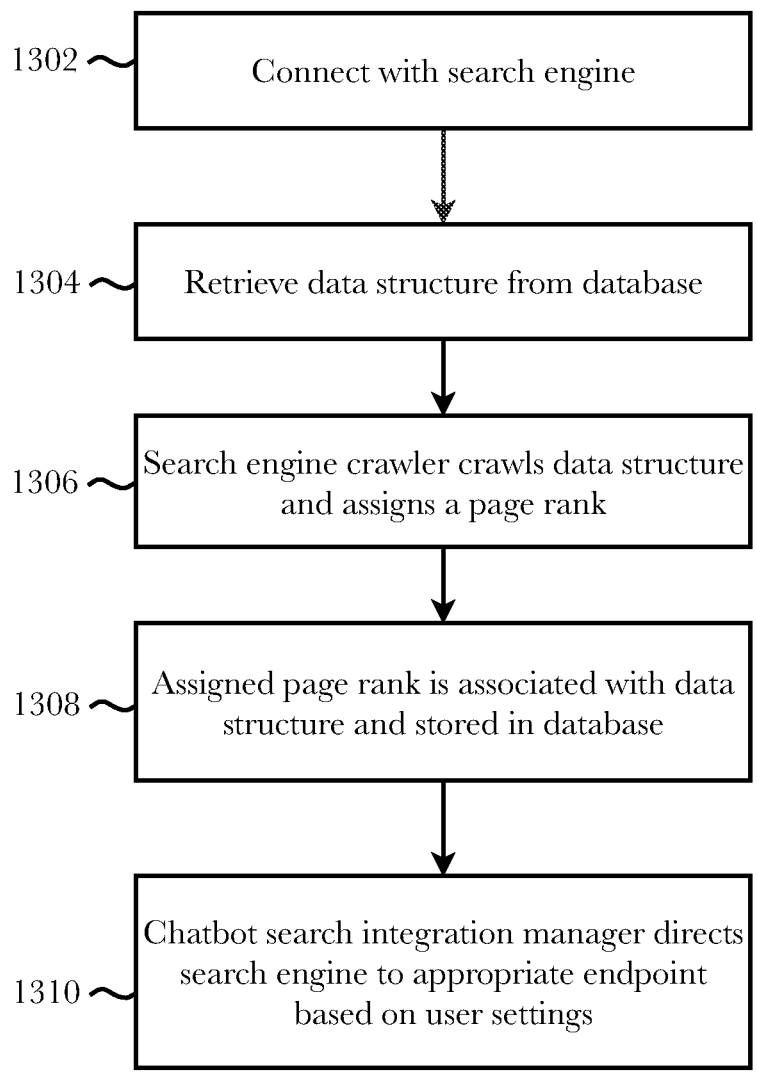
FIG. 13 is a flow diagram illustrating an exemplary method for integrating generated indexable chatbot data with search engines, according to an embodiment.

FIG. 13 is a flow diagram illustrating an exemplary method for integrating generated indexable chatbot data with search engines, according to an embodiment. According to the embodiment, the process begins at step 1302 when chatbot search integration manager 900, via search engine interface 920, connects with a search engine. Once a connection has been made between chatbot search integration manager 900 and the search engine, search engine interface 920 may retrieve, receive, or otherwise obtain a generated data structure from chatbot index database 940 at step 1304. According to some embodiments, the data structure is a static HTML webpage generated by SKM 910 containing information and data extracted from a chatbot knowledge base. At step 1306 the search engine's built-in crawler crawls the data structure identifying the index keywords and features and assigns a page rank to the data structure. The assigned page rank may be associated with the data structure and stored in chatbot index database 940 and/or database 208 at step 1308. This stored page rank may be used for machine algorithm training purposes as described above in FIG. 11 and may also be used to determine if a given data structure is in optimal format by comparing the stored page rank against a predetermined threshold value. As a final step 1310, chatbot search integration manager 900 directs the search engine to the appropriate endpoint based on user settings. During chatbot search engine integration setup a user can specify what chatbot information and data is displayed by a search engine in response to a search engine query which can be answered by relevant data contained in one or more data structures created and stored in chatbot search integration manager 900. For example, a system user can specify that a search engine display and redirect search engine users to a website where the chatbot with the relevant knowledge base is located when a search engine user query is answerable by the information contained in the chatbot knowledge base. Alternatively, a system user can specify that a search engine directly display the relevant information in the web browser without having the search engine redirect the search engine user to a website where the chatbot is located. In this way, chatbot search integration manager 900 can provide integration between a chatbot and its indexed data and a search engine.

Hardwar Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 14:
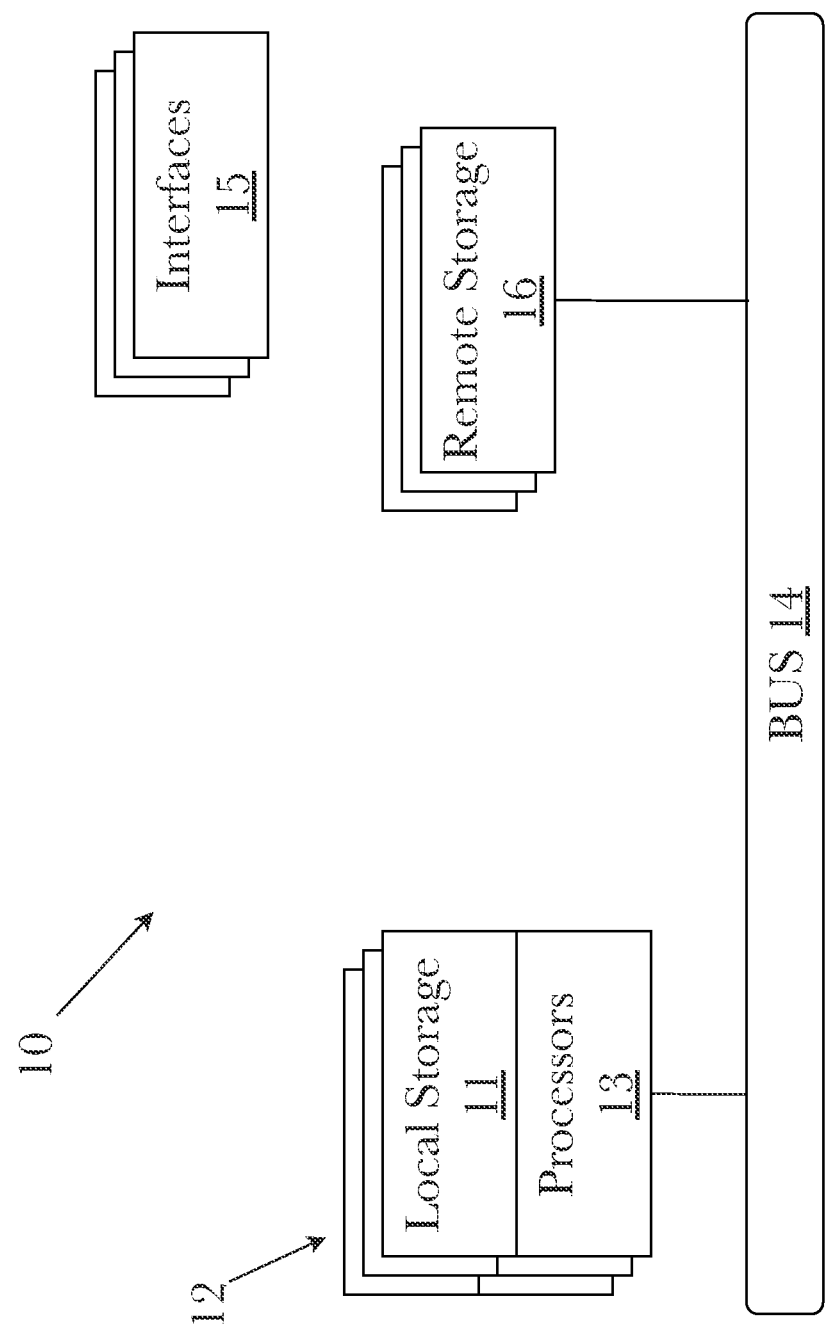
FIG. 14 is a block diagram illustrating an exemplary hardware architecture of a computing device.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
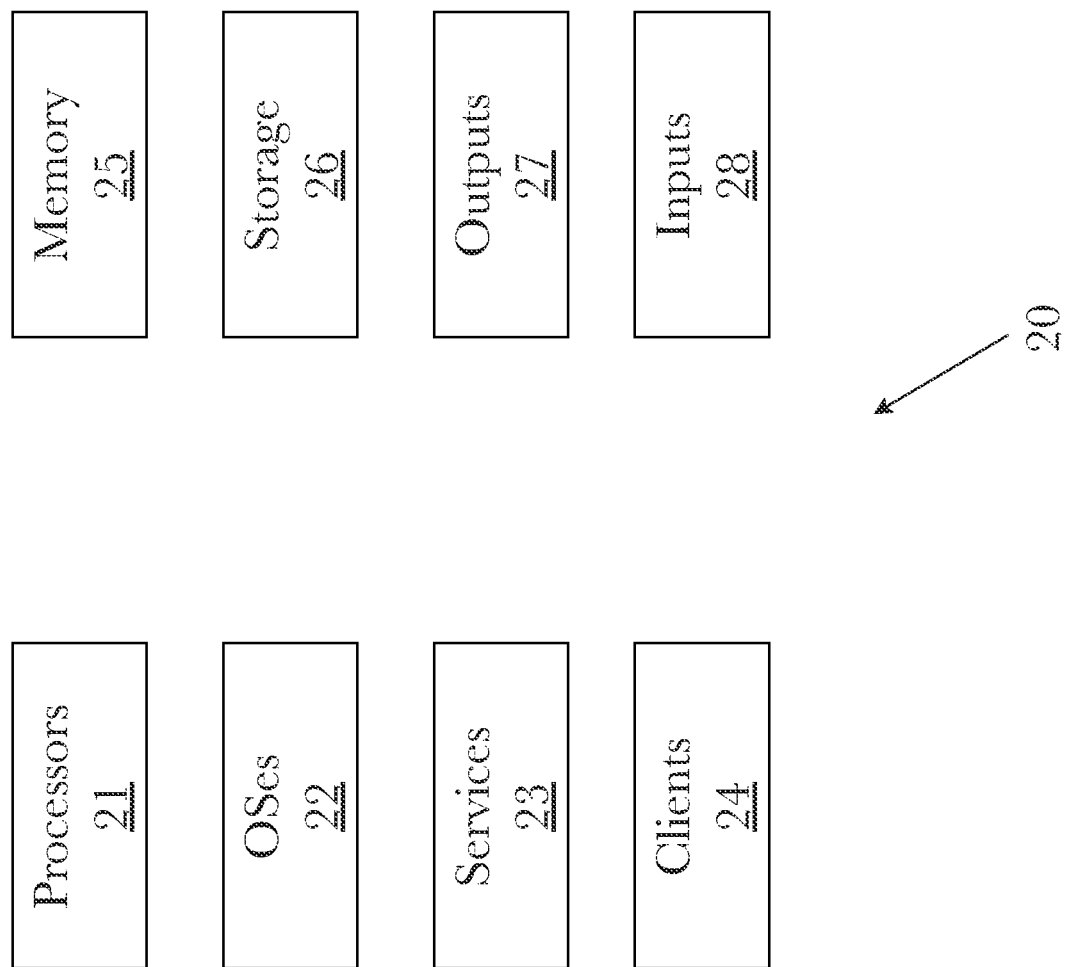
FIG. 15 is a block diagram illustrating an exemplary logical architecture for a client device.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
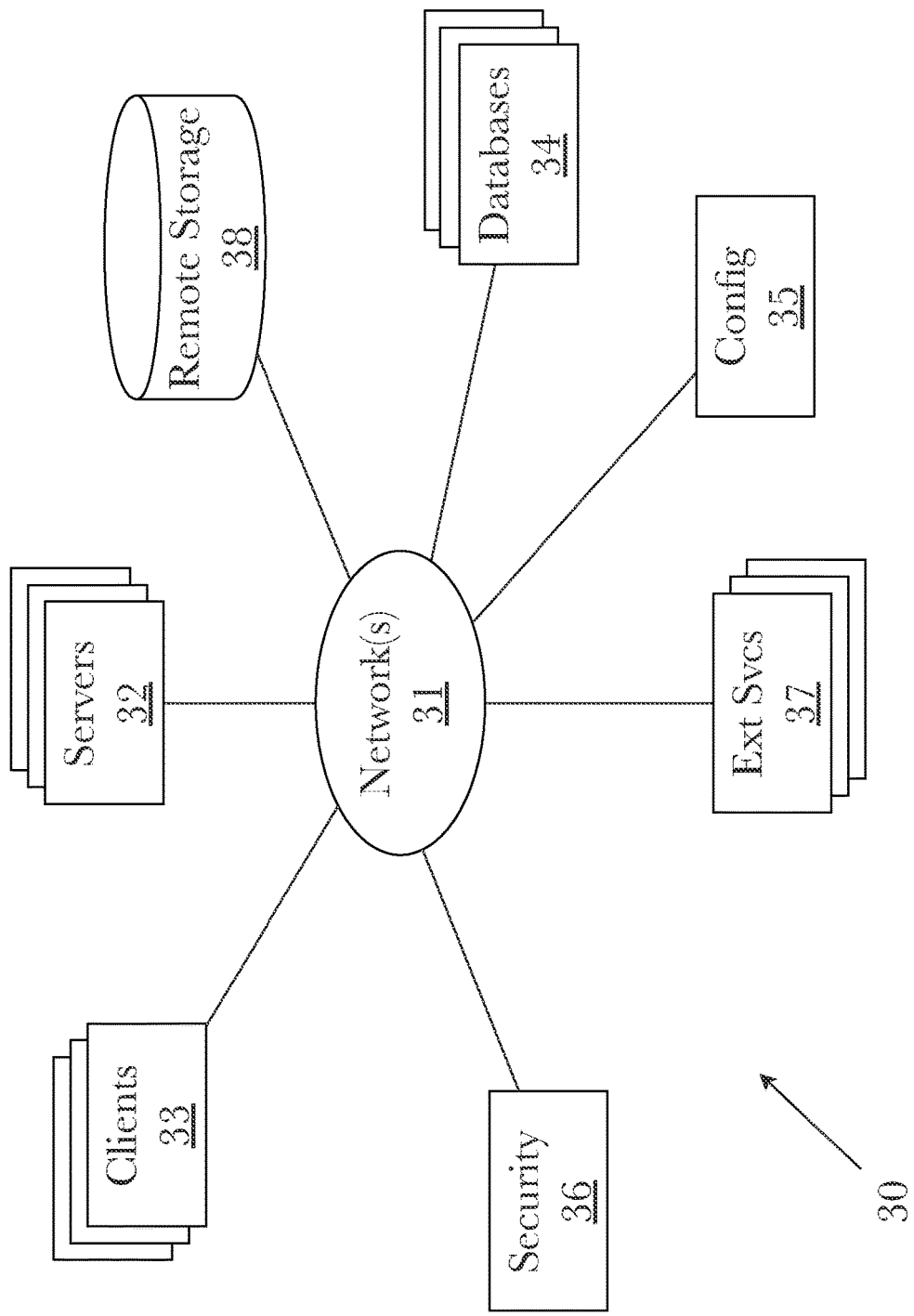
FIG. 16 is a block diagram showing an exemplary architectural arrangement of clients, servers, and external services.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
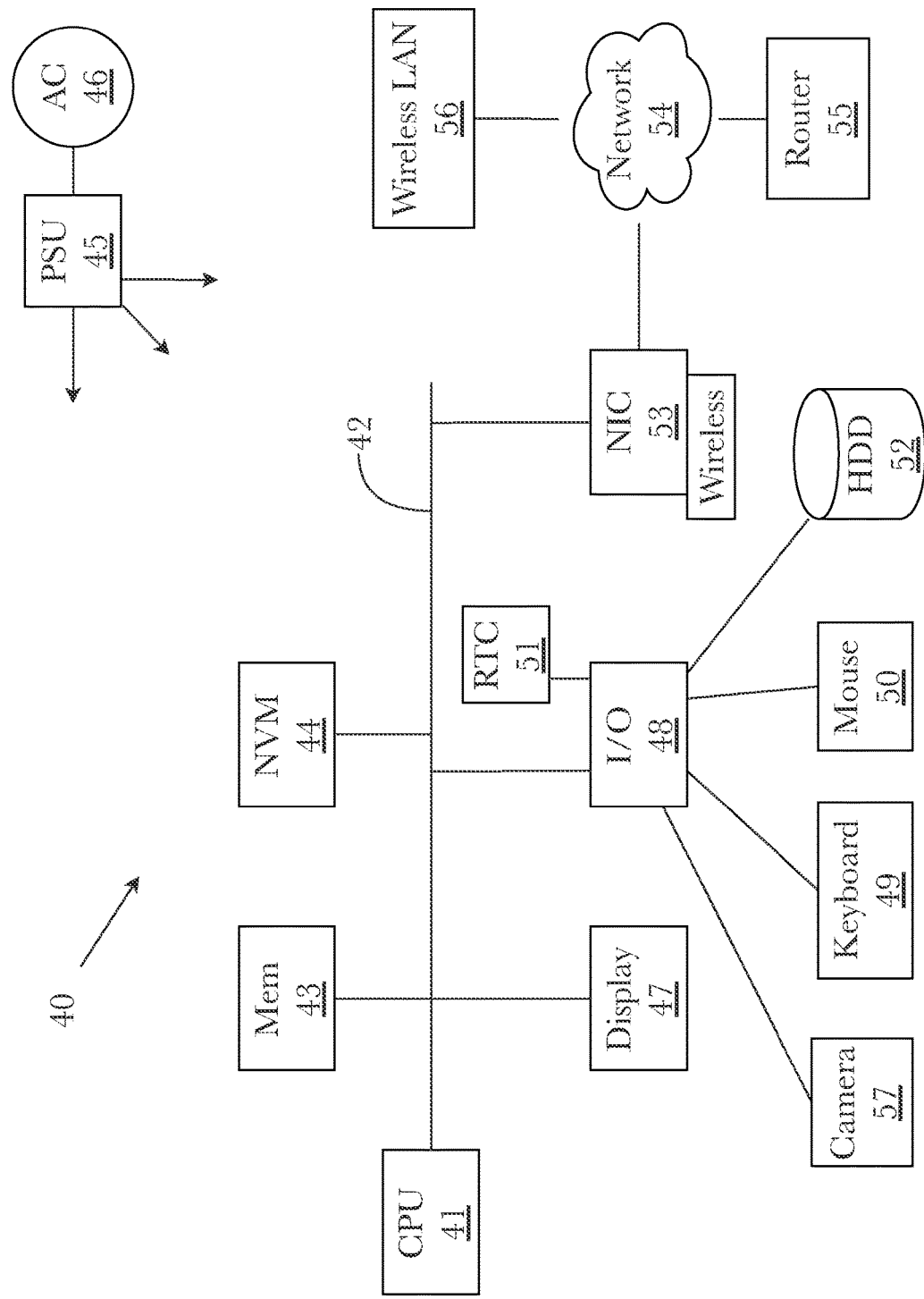
FIG. 17 is another block diagram illustrating an exemplary hardware architecture of a computing device.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for integrating a chatbot with a search engine, comprising:
    a chatbot crawler comprising a first plurality of programming instructions stored in a memory of, and operating on a processor of, a computing device, wherein the first plurality of programming instructions, when operating on the processor, cause the computing device to:
        connect to an enterprise chatbot and traverse a conversation flow detecting a conversation path;
        for each detected conversation path generate a flow chart and a conversation; and
        send the flow chart to a chatbot search integration manager; and
    the chatbot search integration manager comprising a second plurality of programming instructions stored in the memory of, and operating on the processor of, the computing device, wherein the second plurality of programming instructions, when operating on the processor, cause the computing device to:
        receive the flow chart from the chatbot crawler;
        parse the flow chart to extract text data;
        transform the extracted text data into one or more index keywords;
        create a data structure comprising the index keywords;
        store the data structure in a database; and connect to a search engine, wherein the search engine's built in crawler crawls the data structure and assigns a page rank to the data structure.

2. The system of claim 1, wherein the chatbot integration manager parses the flow chart according to a graph traversal algorithm.

3. The system of claim 1, wherein the data structure is a static HyperText Markup Language webpage.

4. The system of claim 1, wherein the assigned page rank is associated with the data structure and stored in the database.

5. The system of claim 1, further comprising a machine learning algorithm configured to determine an optimal format for the data structure.

6. The system of claim 5, further comprising a page optimization engine comprising a third plurality of programming instructions stored in the memory of, and operating on the processor of, the computing device, wherein the third plurality of programming instructions, when operating on the processor, cause the computing device to:
 receive the data structure;
 use the data structure as an input into the machine learning algorithm, wherein the machine learning algorithm outputs an optimized data structure format; and
 send the machine learning output to the chatbot search integration manager.

7. The system of claim 6, wherein the chatbot search integration manager creates a data structure using the received machine learning output as the format for the data structure.

8. The system of claim 5, wherein the machine learning algorithm is a neural network.

9. The system of claim 5, wherein the machine learning algorithm is configured by training the algorithm on training data comprising at least static webpages and for each static webpage an associated with page rank.

10. The system of claim 6, wherein the page optimization engine retrieves the assigned page rank of the data structure and determines if the format is optimal by comparing the page rank to a predetermined threshold value.

11. A method for integrating a chatbot with a search engine, comprising the steps of:
 connecting to an enterprise chatbot and traverse a conversation flow detecting a conversation path;
 for each detected conversation path generating a flow chart and a conversation;
 sending the flow chart to a chatbot search integration manager;
 receiving the flow chart from the chatbot crawler;
 parsing the flow chart to extract text data;
 transforming the extracted text data into one or more index keywords;
 creating a data structure comprising the index keywords;
 storing the data structure in a database; and
 connecting to a search engine, wherein the search engine's built in crawler crawls the data structure and assigns a page rank to the data structure.

12. The method of claim 11, wherein the chatbot integration manager parses the flow chart according to a graph traversal algorithm.

13. The method of claim 11, wherein the data structure is a static HyperText Markup Language webpage.

14. The method of claim 11, wherein the assigned page rank is associated with the data structure and stored in the database.

15. The method of claim 11, further comprising a machine learning algorithm configured to determine an optimal format for the data structure.

16. The method of claim 15, further comprising the steps of:
 receiving the data structure;
 using the data structure as an input into the machine learning algorithm, wherein the machine learning algorithm outputs an optimized data structure format; and
 sending the machine learning output to the chatbot search integration manager.

17. The method of claim 16, wherein the chatbot search integration manager creates a data structure using the received machine learning output as the format for the data structure.

18. The method of claim 15, wherein the machine learning algorithm is a neural network.

19. The method of claim 15, wherein the machine learning algorithm is configured by training the algorithm on training data comprising at least static webpages and for each static webpage an associated with page rank.

20. The method of claim 16, wherein the page optimization engine further performs the steps of: retrieving the assigned page rank of the data structure and determining if the format is optimal by comparing the page rank to a predetermined threshold value.

* * * * *